US012597704B2

(12) United States Patent
Cho et al.

(10) Patent No.: US 12,597,704 B2
(45) Date of Patent: Apr. 7, 2026

(54) ELECTRONIC DEVICE INCLUDING ANTENNA MODULE

(71) Applicant: Samsung Electronics Co., Ltd., Suwon-si (KR)

(72) Inventors: Sujin Cho, Suwon-si (KR); Kihwan Kwon, Suwon-si (KR); Byungjoon Kim, Suwon-si (KR); Heejin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 18/658,094

(22) Filed: May 8, 2024

(65) Prior Publication Data

US 2025/0023230 A1 Jan. 16, 2025

Related U.S. Application Data

(63) Continuation of application No. PCT/KR2024/004357, filed on Apr. 3, 2024.

(30) Foreign Application Priority Data

Jul. 10, 2023 (KR) ........................ 10-2023-0089453
Jul. 20, 2023 (KR) ........................ 10-2023-0094942
(Continued)

(51) Int. Cl.
*H01Q 1/22* (2006.01)
*H01Q 3/06* (2006.01)

(52) U.S. Cl.
CPC ............. *H01Q 3/06* (2013.01); *H01Q 1/2291* (2013.01)

(58) Field of Classification Search
CPC ........... H01Q 1/22; H01Q 1/243; H01Q 1/52; H01Q 21/06; H01Q 21/0025
See application file for complete search history.

(56) References Cited

U.S. PATENT DOCUMENTS 9,065,175 B2 6/2015 Corbin et al.
9,793,599 B2 10/2017 Di Nallo et al.
(Continued)

FOREIGN PATENT DOCUMENTS

KR 10-2016-0108137 A 9/2016
KR 10-2016-0110042 A 9/2016
(Continued)

OTHER PUBLICATIONS

International Search Report dated Jul. 26, 2024, issued in International Application No. PCT/KR2024/004357.

*Primary Examiner* — Hasan Islam
(74) *Attorney, Agent, or Firm* — Jefferson IP Law, LLP

(57) ABSTRACT

An electronic device is provided. The electronic device includes a housing including a support, a printed circuit board disposed in the housing, at least one processor disposed on the printed circuit board, a first antenna module spaced apart from the printed circuit board in the housing, a flexible printed circuit board disposed in the housing, and coupled to the printed circuit board and the first antenna module, to electrically connect the printed circuit board and the first antenna module, a second antenna module disposed in the housing, and including a base substrate and a conductive pattern disposed on the base substrate, and a conductive sheet, wherein the flexible printed circuit board is at least partially overlapped with the second antenna module in a direction of a rear surface of the housing, between the printed circuit board and the first antenna module, and wherein at least a portion of the conductive sheet is disposed between the second antenna module and the flexible printed circuit board at a portion where the second antenna module and the flexible printed circuit board overlap.

20 Claims, 23 Drawing Sheets

(30) Foreign Application Priority Data

| | | | |
|---|---|---|---|
| Jul. 26, 2023 | (KR) | ........................ | 10-2023-0097858 |
| Sep. 11, 2023 | (KR) | ........................ | 10-2023-0120732 |

(56) References Cited

U.S. PATENT DOCUMENTS

| | | | | |
|---|---|---|---|---|
| 10,403,979 | B2 | 9/2019 | Ryu et al. | |
| 11,024,943 | B2 * | 6/2021 | Park ..................... | H01Q 9/0421 |
| 11,047,893 | B2 | 6/2021 | Choi et al. | |
| 11,196,180 | B2 * | 12/2021 | Jo ............................ | H01Q 9/44 |
| 11,246,229 | B2 | 2/2022 | Lee et al. | |
| 11,431,083 | B2 | 8/2022 | Kim et al. | |
| 2020/0127404 | A1 * | 4/2020 | Seo .......................... | H01Q 5/42 |
| 2021/0320396 | A1 | 10/2021 | Kim et al. | |
| 2022/0345559 | A1 | 10/2022 | Heo et al. | |
| 2023/0179020 | A1 | 6/2023 | Kim et al. | |
| 2023/0198128 | A1 | 6/2023 | Oh et al. | |
| 2023/0216199 | A1 | 7/2023 | Oh et al. | |

FOREIGN PATENT DOCUMENTS

| | | | |
|---|---|---|---|
| KR | 10-2020-0101178 | A | 8/2020 |
| KR | 10-2325106 | B1 | 11/2021 |
| KR | 10-2022-0021733 | A | 2/2022 |
| KR | 10-2022-0036077 | A | 3/2022 |
| KR | 10-2023-0023268 | A | 2/2023 |
| KR | 10-2023-0082200 | A | 6/2023 |
| WO | 2021/206271 | A1 | 10/2021 |

* cited by examiner

ELECTRONIC DEVICE INCLUDING ANTENNA MODULE

CROSS-REFERENCE TO RELATED APPLICATION(S)

This application is a continuation application, claiming priority under § 365(c), of an International application No. PCT/KR2024/004357, filed on Apr. 3, 2024, which is based on and claims the benefit of a Korean patent application number 10-2023-0089453, filed on Jul. 10, 2023, in the Korean Intellectual Property Office, of a Korean patent application number 10-2023-0094942, filed on Jul. 20, 2023, in the Korean Intellectual Property Office, of a Korean patent application number 10-2023-0097858, filed on Jul. 26, 2023, in the Korean Intellectual Property Office, and of a Korean patent application number 10-2023-0120732, filed on Sep. 11, 2023, in the Korean Intellectual Property Office, the disclosure of each of which is incorporated by reference herein in its entirety.

TECHNICAL FIELD

The disclosure relates to an electronic device including an antenna module.

BACKGROUND ART

In order to provide a high portable electronic device, the electronic device may include a deformable display. The deformable display may be slidably or foldably deformable. The electronic device may include housings rotatably coupled to each other.

The electronic device may include one or more antenna modules for wireless communication with an external electronic device. For example, the electronic device may include an antenna module for 5$^{th}$ generation (5G) communication in a high frequency band and/or an antenna module for short-range wireless communication. For example, antenna modules may be disposed in any one of the housings rotatably coupled to each other.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device including an antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a support. The electronic device includes a printed circuit board disposed in the housing. The electronic device includes at least one processor disposed on the printed circuit board. The electronic device includes a first antenna module spaced apart from the printed circuit board in the housing. The electronic device includes a flexible printed circuit board disposed in the housing, and coupled to the printed circuit board and the first antenna module, to electrically connect the printed circuit board and the first antenna module. The electronic device includes a second antenna module disposed in the housing, and including a base substrate and a conductive pattern disposed on the base substrate. The electronic device includes a conductive sheet. The flexible printed circuit board is at least partially overlapped with the second antenna module in a direction of a rear surface of the housing, between the printed circuit board and the first antenna module. At least a portion of the conductive sheet is disposed between the second antenna module and the flexible printed circuit board at a portion where the second antenna module and the flexible printed circuit board overlap.

In accordance with another aspect of the disclosure, an electronic device is provided. The electronic device includes a printed circuit board. The electronic device includes a first antenna module spaced apart from the printed circuit board in a first direction. The electronic device includes a flexible printed circuit board coupled to the printed circuit board and the first antenna module to electrically connect the printed circuit board and the first antenna module. The electronic device includes a second antenna module including a base substrate and a conductive pattern disposed on the base substrate. The electronic device includes a conductive sheet. The flexible printed circuit board at least partially overlaps the second antenna module in a second direction perpendicular to the first direction, between the printed circuit board and the first antenna module. At least a portion of the conductive sheet is disposed between the second antenna module and the flexible printed circuit board at a portion where the second antenna module and the flexible printed circuit board overlap.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
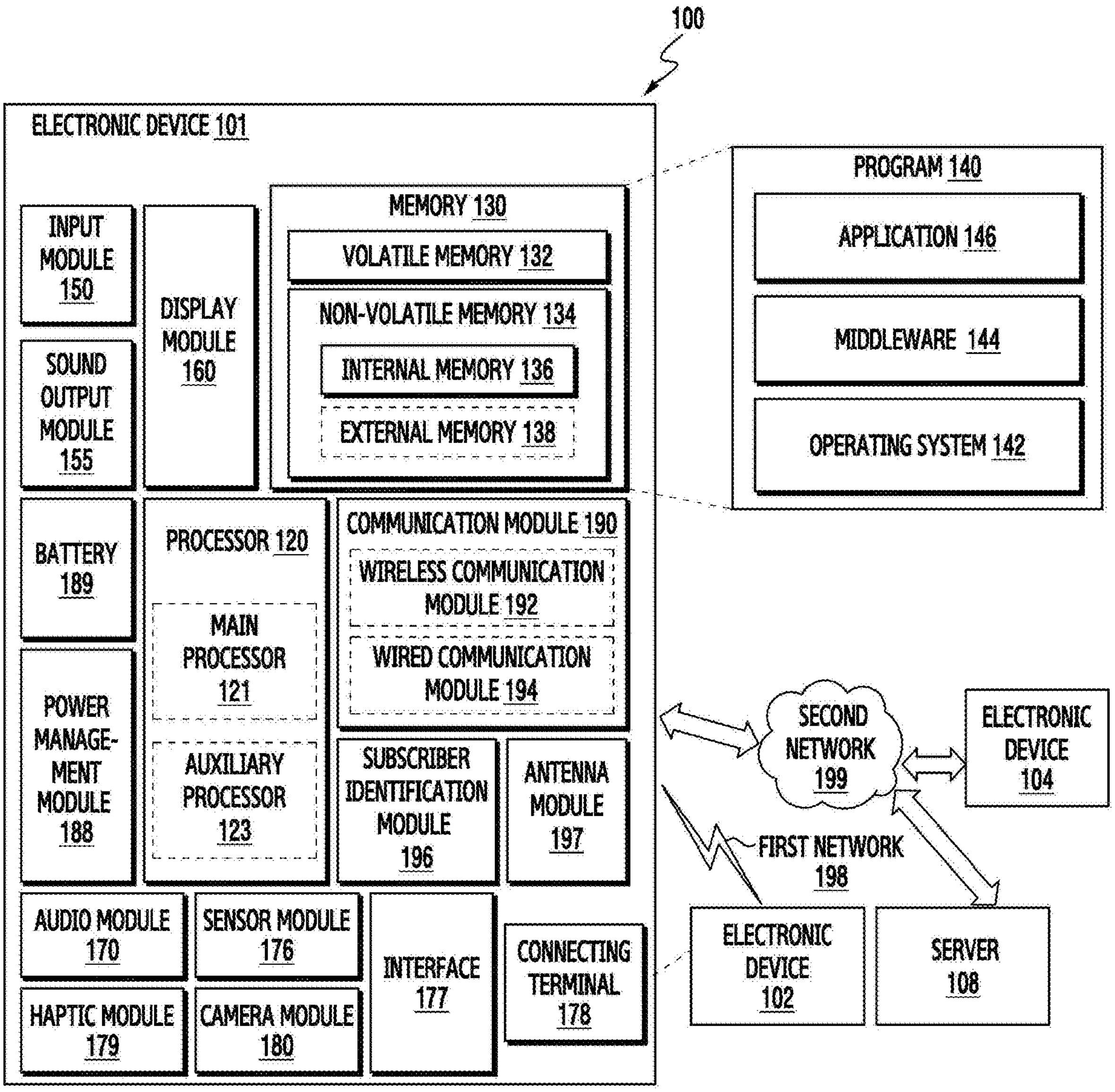
FIG. 1 is a block diagram illustrating an electronic device in a network environment according to various embodiments.

FIG. 1 is a block diagram illustrating an electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor

120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™M, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
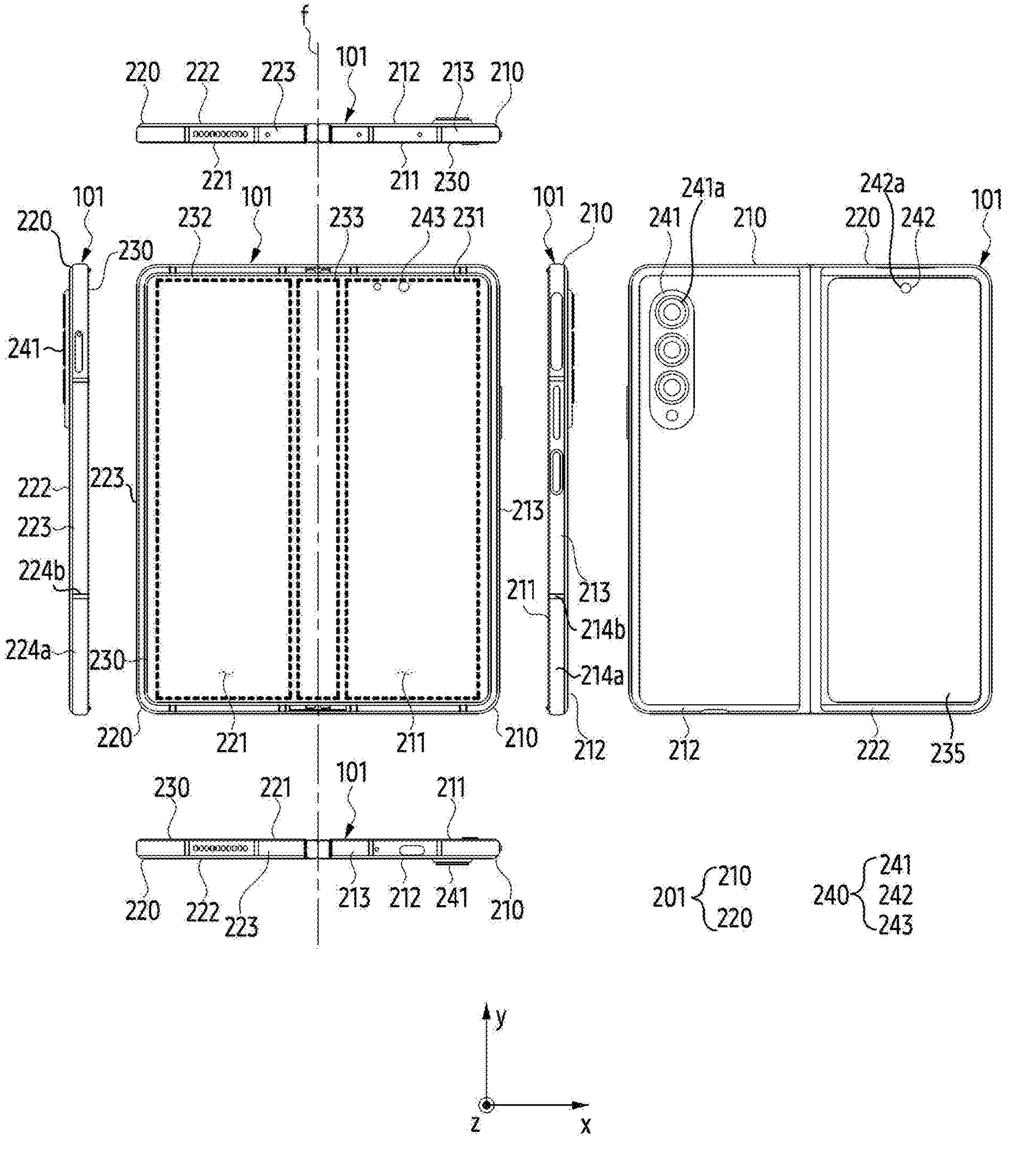
FIG. 2A illustrates an unfolding state of an electronic device according to an embodiment of the disclosure.
Figure 2B:
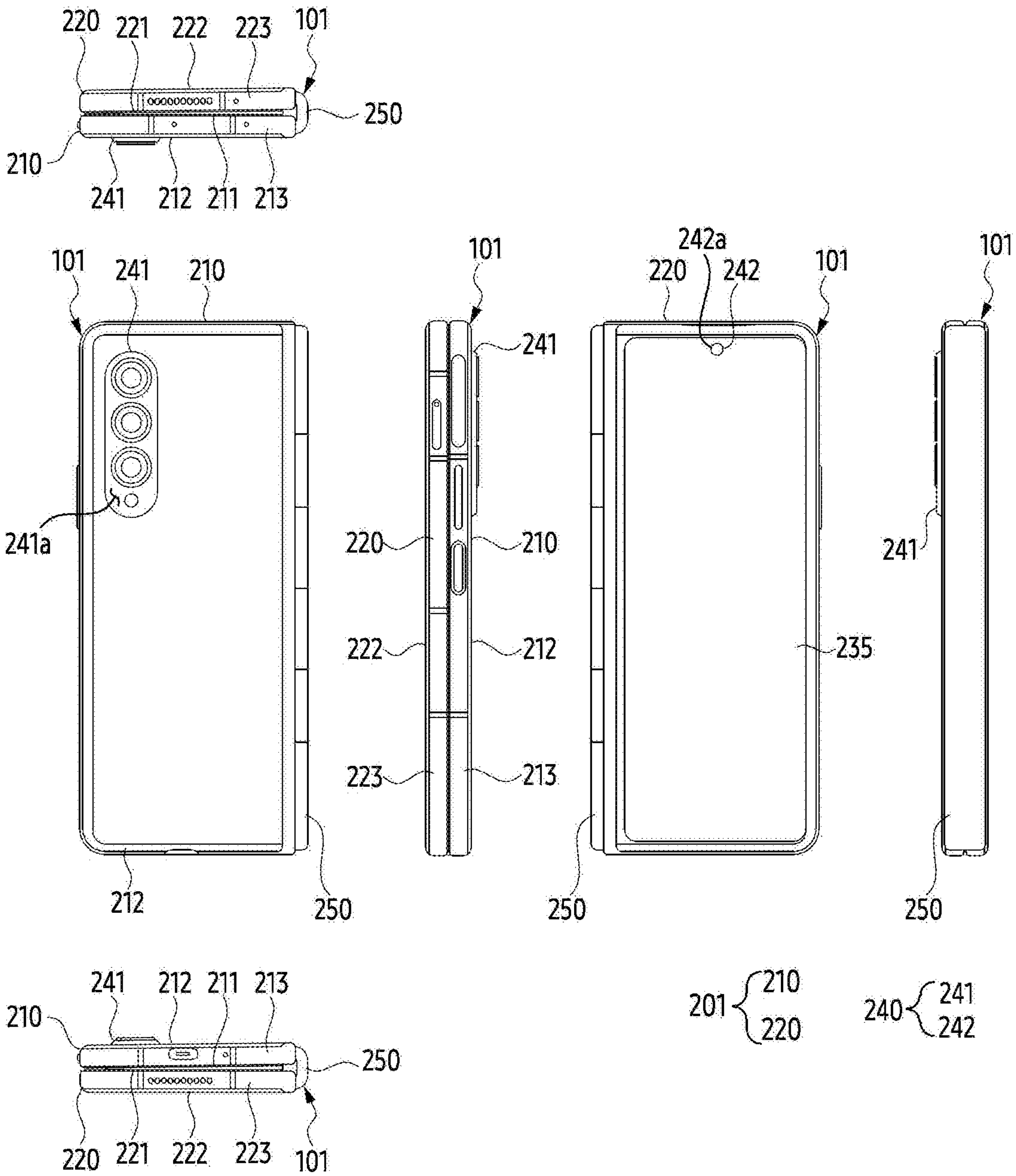
FIG. 2B illustrates a folding state of an electronic device according to an embodiment of the disclosure.
Figure 2C:
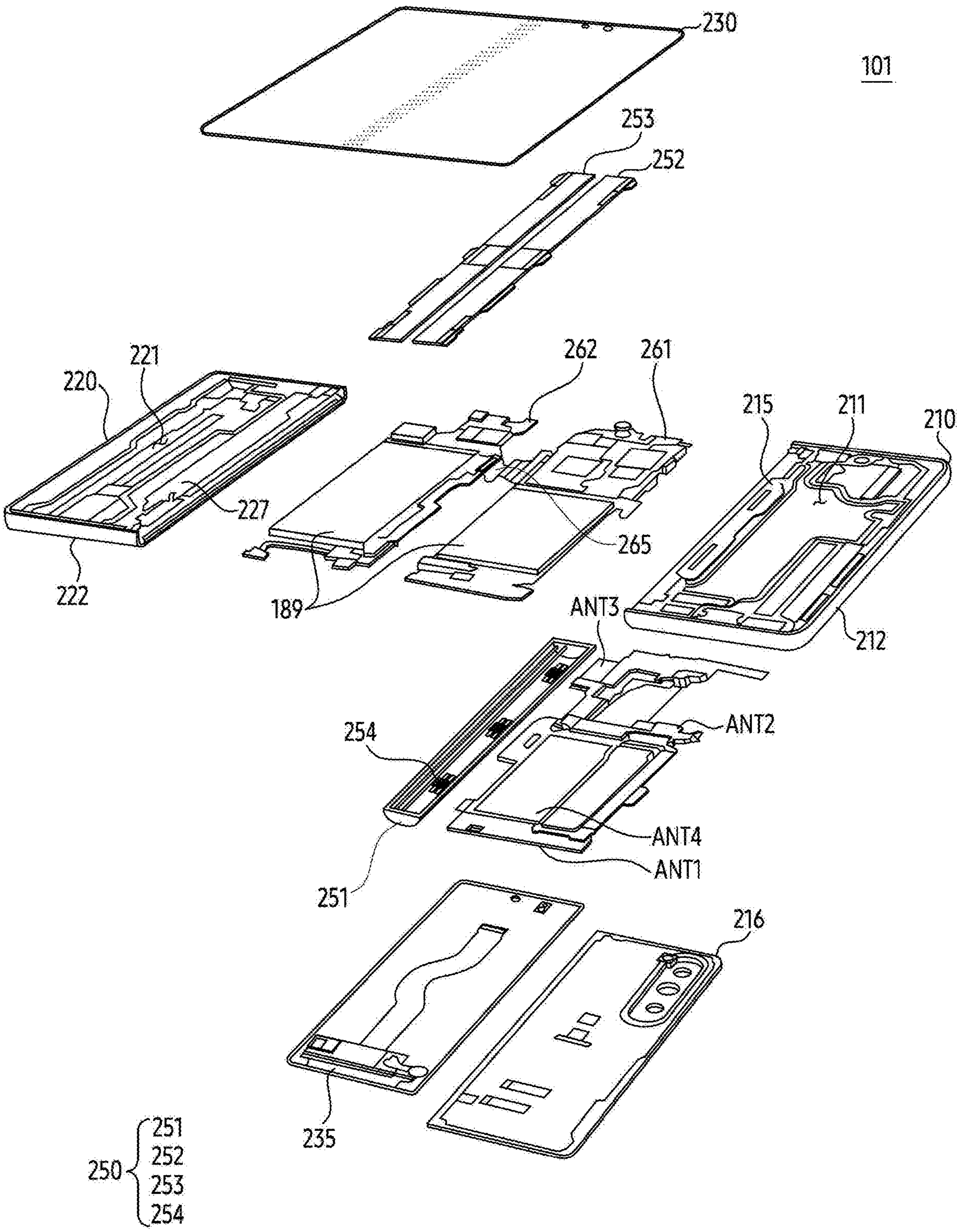
FIG. 2C is an exploded view of an electronic device according to an embodiment of the disclosure.

FIG. 2A illustrates an unfolding state of an electronic device according to an embodiment of the disclosure. FIG. 2B illustrates a folding state of an electronic device according to an embodiment of the disclosure. FIG. 2C is an exploded view of an electronic device according to an embodiment of the disclosure.

Referring to FIGS. 2A, 2B, and 2C, an electronic device (e.g., the electronic device 101 of FIG. 1) may include a housing 201, a display 230 (e.g., the display module 160 of FIG. 1), at least one camera 240 (e.g., the camera module 180 of FIG. 1), and/or a hinge structure 250.

The housing 201 may include a first housing 210 and a second housing 220 that are foldably coupled with respect to a folding shaft f. The first housing 210 and the second housing 220 may define at least a portion of an exterior surface of the electronic device 101. The first housing 210 may include a first surface 211, a second surface 212 opposite to the first surface 211, and a first side surface 213 surrounding at least a portion of the first surface 211 and the second surface 212. For example, the first surface 211 may be referred to as a front surface of the first housing 210, and the second surface 212 may be referred to as a rear surface of the first housing 210. The first side surface 213 may be connected to a periphery of the first surface 211 and a periphery of the second surface 212. The first surface 211, the second surface 212, and the first side surface 213 may form an inner space of the first housing 210. For example, at least one component may be disposed in a space surrounded by the first surface 211, the second surface 212, and the first side surface 213.

The second housing 220 may include a third surface 221, a fourth surface 222 opposite to the third surface 221, and a second side surface 223 surrounding at least a portion of the third surface 221 and the fourth surface 222. For example, the third surface 221 may be referred to as a front surface of the second housing 220, and the fourth surface 222 may be referred to as a rear surface of the second housing 220. The second side surface 223 may be connected to a periphery of the third surface 221 and a periphery of the fourth surface 222. The third surface 221, the fourth surface 222, and the second side surface 223 may form an inner space of the second housing 220. For example, at least one component may be disposed in a space surrounded by the third surface 221, the fourth surface 222, and the second side surface 223.

The display 230 may be configured to display visual information. The display 230 may be disposed on the first surface 211 of the first housing 210 and the third surface 221 of the second housing 220. For example, the display 230 may include a first display area 231 disposed on the first surface 211 of the first housing, a second display area 232 disposed on the third surface 221 of the second housing, and a third display area 233 disposed between the first display area 231 and the second display area 232. For example, the first display area 231, the second display area 232, and the third display area 233 may form a front surface of the display 230. The electronic device 101 may further include a sub-display 235 distinguished from the display 230. The sub-display 235 may be disposed on the fourth surface 222 of the second housing 220.

At least one camera 240 may be configured to obtain an image based on receiving light from an external subject of the electronic device 101. The at least one camera 240 may include first cameras 241, a second camera 242, or a third camera 243. The first cameras 241 may be disposed within the first housing 210. The first housing 210 may include at least one opening 241*a* overlapping the first cameras 241 when the electronic device 101 is viewed from above. The first cameras 241 may obtain an image based on receiving light from the outside of the electronic device 101 through at least one opening 241*a*.

The second camera 242 may be disposed within the second housing 220. The second housing 220 may include at least one opening 242*a* overlapping the second camera 242 when the electronic device 101 is viewed from above. The second camera 242 may obtain an image based on receiving light from the outside of the electronic device 101 through at least one opening 242*a*.

The third camera 243 may be disposed within the first housing 210. The first display area 231 of the display 230 may include at least one opening overlapping the third camera 243 when the display 230 is viewed from above. The third camera 243 may obtain an image based on receiving light from the outside of the display 230 through at least one opening.

The second camera 242 and the third camera 243 may be disposed under the display 230 (e.g., in the −z direction). For example, the second camera 242 and/or the third camera 243 may include an under display camera (UDC) and/or a punch hall camera. For example, when the second camera 242 and the third camera 243 are punch hall cameras, an area of the display 230 corresponding to a position of each of the second camera 242 and the third camera 243 may be an inactive area. For example, when the second camera 242 and/or the third camera 243 are under-display cameras, an area of the display 230 corresponding to a position of each of the second camera 242 and the third camera 243 may not be an inactive area. The inactive area of the display 230 may be referred to as an area of the display 230 that does not include a pixel or not emit light to the outside of the electronic device 101.

The first housing 210 and the second housing 220 may be rotatably coupled. For example, the second housing 220 may be coupled to the first housing 210 in order to be rotatable with respect to the first housing 210 through the hinge structure 250.

The hinge structure 250 may rotatably connect the first housing 210 and the second housing 220. The hinge structure 250 may be disposed between the first housing 210 and the second housing 220 of the electronic device 101 so that the electronic device 101 may be folded. The hinge structure 250 may enable the electronic device 101 to be changed from an unfolding state to a folding state. The hinge structure 250 may enable the electronic device 101 to be changed from the folding state to the unfolding state. The hinge structure 250 may maintain the electronic device 101 in an intermediate state between the unfolding state and the folding state.

The unfolding state may be referred to as a state in which a first direction in which the first display area 230*a* faces and a second direction in which the second display area 230*b* faces are the same. The folding state may be referred to as a state in which the first direction is opposite to the second direction. When the electronic device 101 is in the folding state, the first housing 210 and the second housing 220 may be stacked or overlapped.

When the electronic device 101 is in the folding state and the intermediate state, the first direction and the second direction may be different from each other. When the electronic device 101 is in the folding state, the first direction and the second direction may be opposite to each other. When the electronic device 101 is in the intermediate state, the first direction may have a slope (e.g., an angle between 0 to 180 degrees) with respect to the second direction.

The electronic device 101 may be rotatable based on a folding axis f. The folding axis f may be referred to as a virtual line extending along a direction parallel to a longitudinal direction of the electronic device 101 (e.g., y-axis) or a direction parallel to a width direction of the electronic device 101.

The electronic device 101 may include at least one conductive portion 214*a* and 224*a* and at least one non-conductive portion 214*b* and 224*b* included in the first side surface 213 and/or the third side surface 223. For example, the at least one conductive portion 214*a* and 224*a* may be separated from another conductive portion within the first side surface 213 and/or the third side 223 by contacting at least one non-conductive portion 214*b* and 224*b*. At least one conductive portion 214*a* and 224*a* may operate as an antenna radiator to be used for communication with an external electronic device.

Referring to FIG. 2C, the hinge structure 250 may include a hinge cover 251, a first hinge plate 252, a second hinge plate 253, and a hinge device 254. The hinge cover 251 may surround internal components of the hinge structure 250 and define an exterior surface of the hinge structure 250. For example, when the electronic device 101 is in the folding state, at least a portion of the hinge cover 251 may be exposed to the outside of the electronic device 101 through a space between the first housing 210 and the second housing 220. However, it is not limited thereto. For example, when the electronic device 101 is in the unfolding state, the hinge cover 251 may not be exposed to the outside of the electronic device 101 by being covered by the first housing 210 and the second housing 220.

The first hinge plate 252 and the second hinge plate 253 may rotatably connect the first housing 210 and the second housing 220, by being operably coupled to the first housing 210 and the second housing 220, respectively. The first hinge plate 252 may be operably coupled to a first support 215 of the first housing 210, and the second hinge plate 253 may be operably coupled to a second support 227 of the second housing 220. As the first hinge plate 252 and the second hinge plate 253 are operably coupled to the first support 215 and the second support 227, respectively, the first housing 210 and the second housing 220 may be rotatable according to the rotation of the first hinge plate 252 and the second hinge plate 253.

The hinge device 254 may rotate the first hinge plate 252 and the second hinge plate 253. For example, the hinge device 254 may include gears that are engaged with each other and rotatable. The hinge device 254 may rotate the first hinge plate 252 and the second hinge plate 253 based on the folding axis f through gears.

The first housing 210 may include the first support 215 and a rear cover 216. The first support 215 may be disposed within the first housing 210 and may support at least one component disposed within the first housing 210. The rear cover 216 may be disposed on the second surface 222 of the first housing 210 to cover a rear surface of the first housing 210. The second housing 220 may include the second support 225. The second support 225 may be disposed with the second housing 220 and may support at least one component disposed within the second housing 220. For example, the sub-display 235 may be disposed below the second support 225 (e.g., in the-z direction).

An electronic device 101 may include a plurality of electronic components for implementing various functions in addition to the at least one camera 240 described above. For example, the electronic device 101 may include a first printed circuit board 261, a second printed circuit board 262, a flexible printed circuit board 265, and/or a battery 189. The electronic components described above are illustrative only and are not limited thereto.

The first printed circuit board 261 and the second printed circuit board 262 may provide an electrical connection of components in the electronic device 101, respectively. The first printed circuit board 261 may be disposed in the first housing 210, and the second printed circuit board 262 may be disposed in the second housing 220. The first printed circuit board 261 may provide an electrical connection between electronic components disposed in the first housing 210. The second printed circuit board 262 may provide an electrical connection between electronic components disposed in the second housing 220. The flexible printed circuit board 265 may electrically connect the first printed circuit board 261 and the second printed circuit board 262. For example, the flexible printed circuit board 265 may extend from the first printed circuit board 261 to the second printed circuit board 262 across the hinge structure 250. For example, the flexible printed circuit board 265 may at least partially overlap the hinge structure 250.

The battery 189 may be a device for supplying power to at least one component of the electronic device 101, and may include, for example, a non-rechargeable primary battery and/or a rechargeable secondary battery.

The electronic device 101 may include a plurality of antennas ANT1, ANT2, ANT3, and ANT4 to be used for communication with an external electronic device. The electronic device 101 may include a main antenna ANT1, a sub-antenna ANT2, an ultra-wide band (UWB) antenna ANT3, and/or an antenna ANT4 for short-range wireless communication. However, it is not limited thereto.

Figure 2D:
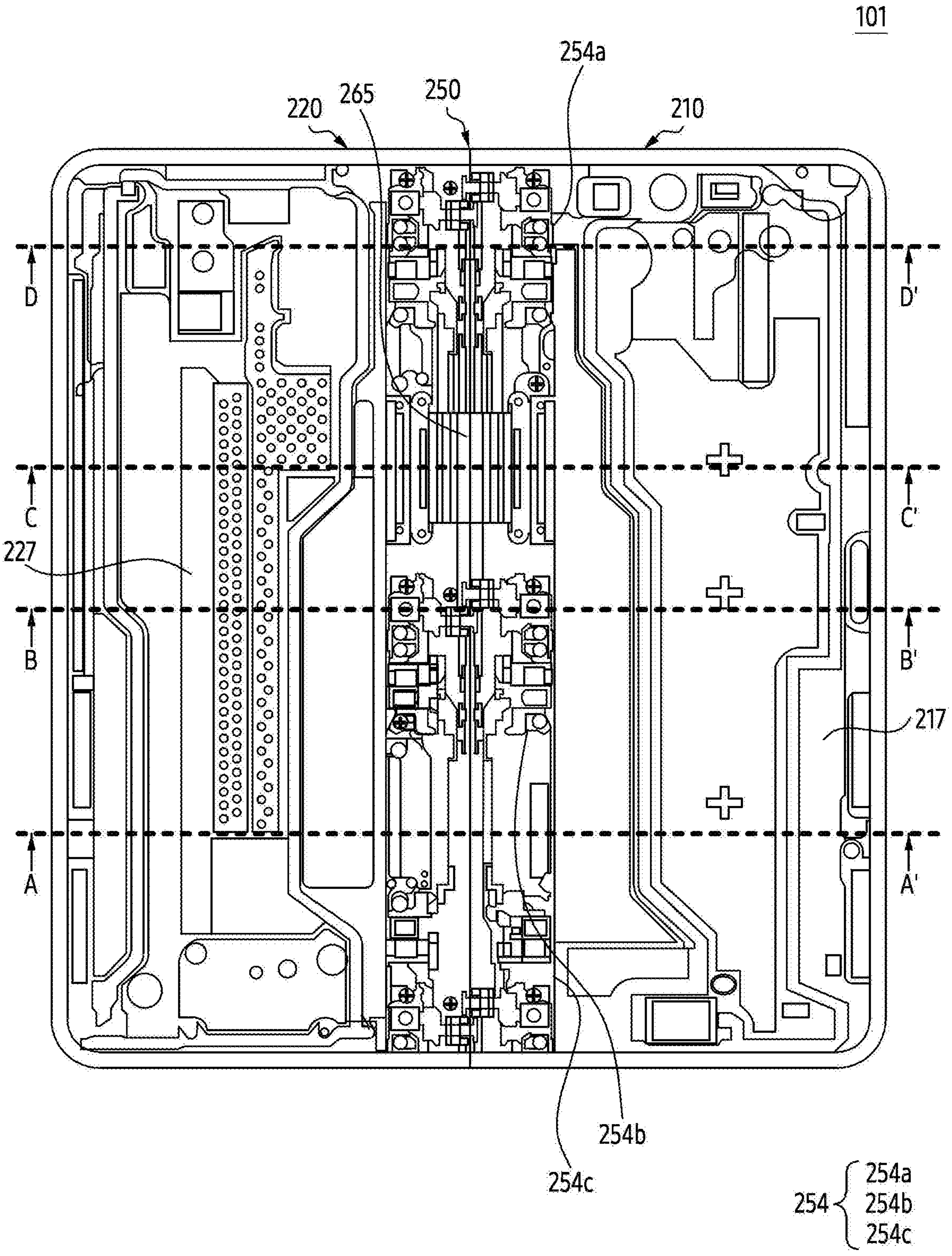
FIG. 2D illustrates an electronic device in which a display is omitted, according to an embodiment of the disclosure.

FIG. 2D illustrates an electronic device in which a display is omitted, according to an embodiment of the disclosure.

When a display (e.g., the display 230 of FIG. 2A) is omitted, the first support 215 of the first housing 210 and the second support 227 of the second housing 220 may be visible. The hinge structure 250 may be disposed between the first support 215 and the second support 227. The hinge structure 250 may include a hinge device 254 for an operation of a hinge plate (e.g., the first hinge plate 252 and the second hinge plate 253 of FIG. 2C).

The hinge device 254 may include spiral parts for adjusting a rotation angle. For example, the first housing 210 and the second housing 220 may be folded or unfolded based on the rotational motion of the spiral parts.

The hinge device 254 may include a first hinge device 254*a*, a second hinge device 254*b*, and a third hinge device 254*c*, which are spaced apart from each other. A flexible printed circuit board 265 for electrically connecting the first printed circuit board (e.g., the first printed circuit board 261 of FIG. 2C) and the second printed circuit board 262 may be disposed between the first hinge device 254*a* and the second hinge device 254*b*. For example, the flexible printed circuit board 265 may extend from the first printed circuit board (e.g., the first printed circuit board 261) in the first housing 210 to the second printed circuit board 262 in the second housing 220 across between the first hinge device 254*a* and the second hinge device 254*b*. A first antenna module 310 to be described later may be disposed between the second hinge device 254*b* and the third hinge device 254*c*.

Hereinafter, one or more components to be described later with reference to drawings may be implemented together with the components of the electronic device 101 described with reference to FIGS. 2A, 2B, 2C, and 2D. The same reference numerals may be assigned to the components identical to the above-described components, and overlapping descriptions may be omitted.

In the disclosure, relative terms such as 'above' and 'under' may be used to describe a relative position between components. For example, when the electronic device 101 illustrated in the drawing is flipped, the top and the bottom may be switched.

In the disclosure, the electronic device 101 is described as a structure including a foldable housing 201, but is not limited thereto. For example, the electronic device 101 includes a first housing 210 and a second housing 220 rotatably coupled to the first housing 210, but the structure of the housing 201 is not limited thereto. For example, the electronic device 101 may include a bar-type housing having a fixed shape. For example, the electronic device 101 may include a housing including a first housing and a second housing that are slidably connected. The electronic device 101 may include a structure in which at least a portion of a conductive sheet (e.g., a conductive sheet 330 of FIG. 6A) is arranged in an overlapping portion between the second antenna module (e.g., a second antenna module 320 of FIG. 3A) and the flexible printed circuit board (e.g., a flexible printed circuit board 263 of FIG. 3A) inside the housing 201, independently of a structure of the housing 201.

Figure 3A:
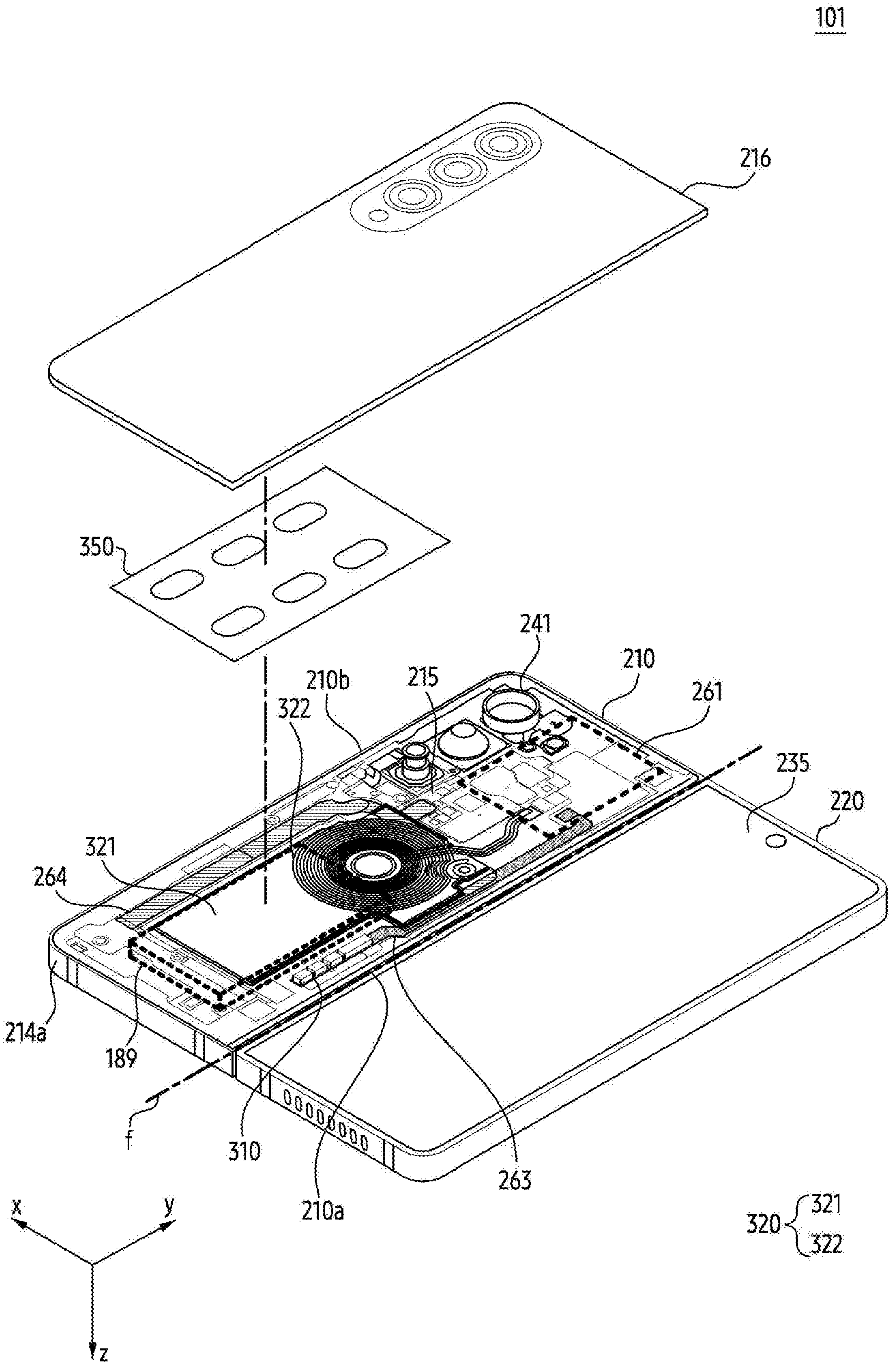
FIG. 3A is a perspective view of an electronic device according to an embodiment of the disclosure.
Figure 3B:
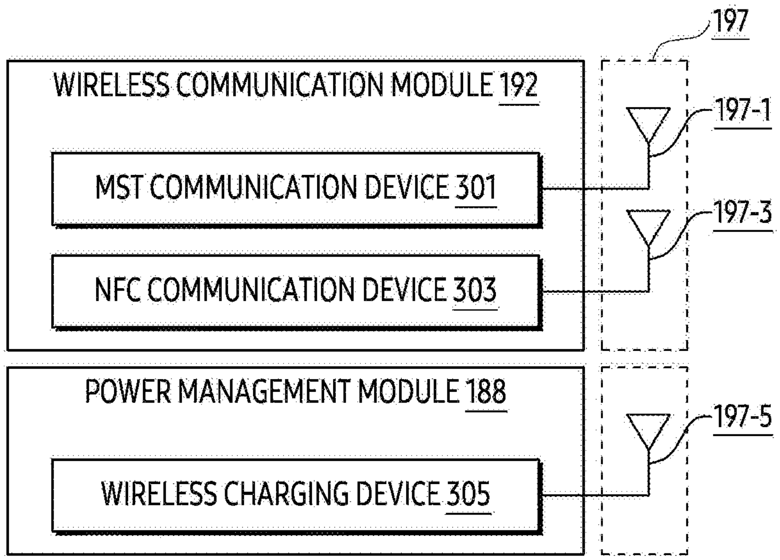
FIG. 3B is a block diagram illustrating the wireless communication module, the power management module, and the antenna module of the electronic device according to an embodiment of the disclosure.

FIG. 3A is a perspective view of an electronic device according to an embodiment of the disclosure. FIG. 3B is a block diagram illustrating the wireless communication module, the power management module, and the antenna module of the electronic device according to an embodiment of the disclosure.

Referring to FIG. 3A, an electronic device 101 may include a first housing 210, a second housing 220, a printed circuit board 261, a first antenna module 310, a flexible printed circuit board 263, and a second antenna module 320.

The electronic device 101 may include the first housing 210 and the second housing 220 rotatably coupled to each other. The second housing 220 may be configured to be rotatable with respect to the first housing 210 based on a folding axis f. The electronic device 101 may include a hinge structure (e.g., the hinge structure 250 of FIG. 2C) that rotatably connects the first housing 210 and the second housing 220.

The first housing 210 may include a support 215. The support 215 may support at least one component of the first housing 210. The support 215 may support a plurality of camera modules (e.g., the first cameras 241). For example, the printed circuit board 261, the first antenna module 310, the flexible printed circuit board 263, and/or the second antenna module 320 described later may be supported by the support 215, by being disposed on the support 215. In terms of supporting at least one component, the support 215 may be referred to as a bracket, a supporting structure, a supporting member, a supporting plate, a supporting portion, a front structure, and/or a rear structure.

The printed circuit board 261 may be disposed within the first housing 210. The printed circuit board 261 may be supported by the support 215 by being disposed on the support 215. The printed circuit board 261 may provide an electrical connection between a plurality of electronic components of the electronic device 101. For example, the printed circuit board 261 may include a plurality of conductive layers and a plurality of non-conductive layers alternately laminated with the plurality of conductive layers. The printed circuit board 261 may provide an electrical connection between various electronic components by using wirings and conductive via 321*d* formed on the conductive layer.

The first antenna module 310 may include a mmWave antenna module capable of supporting a high frequency band (e.g., millimeter wave (mmWave) band). For example, the first antenna module 310 may form a directional beam to transmit and/or receive a signal in a high frequency band.

At least one processor (e.g., the processor 120 and/or the wireless communication module 192 of FIG. 1) may be configured to communicate with an external electronic device by using the first antenna module 310. The at least one processor may generate a baseband signal. The baseband signal may be up-converted to a signal in a designated frequency band through RFIC. The up-converted signal may be filtered through the radio frequency front end (RFFE) and radiated to the outside of the electronic device 101 through the first antenna module 310. A signal received from an external electronic device through the first antenna module 310 may be preprocessed through the RFFE. The RFIC may down-convert the preprocessed radio signal to a baseband signal so that the preprocessed radio signal may be processed by at least one processor. The down-converted signal may be provided to at least one processor disposed on the printed circuit board 261.

The at least one processor may be electrically connected to the printed circuit board 261 by being disposed on the printed circuit board 261. As described above, the at least one processor may include an electrical connection between the printed circuit board 261 and the first antenna module 310 to communicate with an external electronic device using the first antenna module 310.

The first antenna module 310 may be spaced apart from the printed circuit board 261. It may be difficult to dispose both the at least one processor and the first antenna module 310 on the printed circuit board 261 due to limitation of a mounting space. For example, the electronic device 101 may require a space for a plurality of electronic components (e.g., the battery 189) disposed in the first housing 210. For example, an internal space for the operation of the hinge structure 250 rotatably connecting the first housing 210 and the second housing 220 may be required.

The first antenna module 310 may be spaced apart from the printed circuit board 261 without being directly connected to the printed circuit board 261 due to the limitation of mounting space. For example, the first antenna module 310 may be spaced apart from the printed circuit board 261 along the extending direction of the folding axis f. For example, the folding axis f may be parallel to the y axis. For example, the printed circuit board 261 may be disposed relatively upper (e.g., in the +y direction) within the first housing 210, and the first antenna module 310 may be disposed relatively lower (e.g., in the −y direction) within the first housing 210. However, it is not limited thereto. When the first antenna module 310 is spaced apart from the printed circuit board 261, the flexible printed circuit board 263 may be included for electrical connection between the first antenna module 310 and the printed circuit board 261.

The flexible printed circuit board 263 may electrically connect the printed circuit board 261 and the first antenna module 310, which are spaced apart from each other. For example, the flexible printed circuit board 263 may be disposed within the first housing 210. The flexible printed circuit board 263 may be connected to each of the printed circuit board 261 and the first antenna module 310 to electrically connect the printed circuit board 261 and the first antenna module 310. For example, the flexible printed circuit board 263 may be implemented as a flexible printed circuit board radio frequency cable (FRC). A transmission signal to be transmitted to an external electronic device and a reception signal received from an external electronic device may be transmitted through a signal line (e.g., a radio frequency (RF) signal line) included in the flexible printed circuit board 263.

The flexible printed circuit board 263 may extend from the printed circuit board 261 to the first antenna module 310. For example, an end of the flexible printed circuit board 263 may be connected to the printed circuit board 261, and another end of the flexible printed circuit board 263 may be connected to the first antenna module 310. As described above, when the first antenna module 310 is spaced apart from the printed circuit board 261 along the extending direction of the folding axis f, the flexible printed circuit board 263 may extend along the extending direction of the folding axis f. For example, the flexible printed circuit board 263 may extend along the y-axis direction.

The second antenna module 320 may include a conductive pattern 322 for transmitting and/or receiving a short-range wireless signal.

Referring to FIG. 3B, the wireless communication module 192 may include a magnetic secure transmission (MST) communication device 301 or a near-field communication (NFC) device 303, and the power management module 188 may include a wireless charging device 305. For example, the antenna module 197 may include a plurality of antennas that include an MST antenna 197-1 connected with the MST communication device 301, an NFC antenna 197-3 connected with the NFC communication device 303, and a wireless charging antenna 197-5 connected with the wireless charging device 305. The same components as those described in regard to FIG. 1 are briefly described or omitted from the description.

For example, the MST communication device 301 may receive a signal containing control information or payment information such as card information from the processor 120, generate a magnetic signal corresponding to the received signal, and then transfer the generated magnetic signal to the external electronic device (e.g., a point-of-sale (POS) device) via the MST antenna 197-1. To generate the magnetic signal, the MST communication device 301 may include a switching module (not shown) that includes one or more switches connected with the MST antenna 197-1, and control the switching module to change the direction of voltage or current supplied to the MST antenna 197-1 according to the received signal. The change of the direction of the voltage or current allows the direction of the magnetic signal (e.g., a magnetic field) emitted from the MST antenna 197-1 to change accordingly. If detected at the external electronic device, the magnetic signal with its direction changing may cause an effect (e.g., a waveform) similar to that of a magnetic field that is generated when a magnetic card corresponding to the card information associated with the received signal is swiped through a card reader of the external electronic device. For example, payment-related information and a control signal that are received by the external electronic device in the form of the magnetic signal may be further transmitted to an external server 108 (e.g., a payment server) via the network.

For example, the NFC communication device 303 may obtain a signal containing control information or payment information such as card information from the processor 120 and transmit the obtained signal to the external electronic device via the NFC antenna 197-3. For example, the NFC communication device 303 may receive such a signal transmitted from the external electronic device via the NFC antenna 197-3.

For example, the wireless charging device 305 may wirelessly transmit power to the external electronic device (e.g., a cellular phone or wearable device) via the wireless charging antenna 197-5, or wirelessly receive power from the external electronic device (e.g., a wireless charging device). The wireless charging device 305 may support one or more of various wireless charging schemes including, for example, a magnetic resonance scheme or a magnetic induction scheme.

According to an embodiment of the disclosure, the MST antenna 197-1, the NFC antenna 197-3, and/or the wireless charging antenna 197-5 may share at least part of their radiators. For example, the radiator of the MST antenna 197-1 may be used as the radiator of the NFC antenna 197-3 or the wireless charging antenna 197-5, or vice versa. The antenna module 197 may include a switching circuit (not shown) adapted to selectively connect (e.g., close) or disconnect (e.g. open) at least part of the antennas 197-1, 197-3, or 197-5, for example, under the control of the wireless communication module 192 (e.g., the MST communication device 301 or the NFC communication device 303) or the power management module (e.g., the wireless charging device 305). For example, when the electronic device 101 uses a wireless charging function, the NFC communication device 303 or the wireless charging device 305 may control the switching circuit to temporarily disconnect at least one portion of the radiators shared by the NFC antenna 197-3 and the wireless charging antenna 197-5 from the NFC antenna 197-3 and to connect the at least one portion of the radiators with the wireless charging antenna 197-5.

At least one function of the MST communication device 301, the NFC communication device 303, or the wireless charging device 305 may be controlled by an external processor (e.g., the processor 120). According to an embodiment, at least one specified function (e.g., a payment function) of the MST communication device 301 or the NFC communication device 303 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Referring back to FIG. 3A, the second antenna module 320 may be disposed between the rear cover 216 and the support 215. An electronic device 101 may include a buffer member (e.g., sponge) 350 disposed between the rear cover 216 and the second antenna module 320. The buffer member 350 may alleviate an impact caused by a contact between the rear cover 216 and the second antenna module 320 and reduce noise caused by the contact.

The first housing 210 may include a first edge 210*a* and a second edge 210*b* parallel to the folding axis f. The first edge 210*a* may be an edge of the first housing 210 in the −x direction, and the second edge 210*b* may be an edge of the first housing 210 in the +x direction. For example, the first edge 210*a* may be located closer to the second housing 220 than the second edge 210*b*. For example, the first antenna module 310 may be located closer to the first edge 210*a* among the first edge 210*a* and the second edge 210*b*, in the first housing 210.

At least a portion of the second edge 210*b* may include a conductive portion (e.g., at least one conductive portion 214*a* of FIG. 2A). The conductive portion 214*a* may operate as an antenna radiator for transmitting and/or receiving a signal on a designated frequency band. An electronic device 101 according to another embodiment may further include another flexible printed circuit board 264 for electrically connecting the conductive portion 214*a* and at least one processor (e.g., the processor 120 of FIG. 3B) and a wireless communication module (e.g., the wireless communication module 192 of FIG. 3B) disposed on the printed circuit board 261. For example, the other flexible printed circuit board 264 may be disposed between the printed circuit board 261 and a printed circuit board (not shown) for the conductive portion 214*a*.

A space in which the first antenna module 310 may be disposed at a location close to the second edge 210*b* may be insufficient, due to a space occupied by the other flexible printed circuit board 264. When the first antenna module 310 is located closer to the second edge 210*b* than the first edge 210*a*, the first antenna module 310 may be located closer to the conductive portion 214*a*. When the first antenna module 310 and the conductive portion 214*a* are located close, the communication performance of the electronic device 101 may be deteriorated by electromagnetically interacting with a signal transmitted and/or received through the first antenna module 310 and a signal transmitted and/or received through the conductive portion 214*a*. The first antenna module 310 may be disposed closer to the first edge 210*a* than the second edge 210*b* to avoid electromagnetic interaction with the conductive portion 214*a* and overcome the limitation of an arrangement space (or mounting space). For example, the first antenna module 310 may be disposed between the battery 189 and the first edge 210*a*. However, the disclosure is not limited thereto.

The second antenna module 320 may include a base substrate 321 and a conductive pattern 322 disposed on the base substrate 321.

Since the flexible printed circuit board 263 extends from the printed circuit board 261 to the first antenna module 310 to electrically connect the printed circuit board 261 to the first antenna module 310, the second antenna module 320 and the flexible printed circuit board 263 may at least partially overlap. For example, between the printed circuit board 261 and the first antenna module 310, at least a portion of the flexible printed circuit board 263 may overlap at least a portion of the second antenna module 320. For example, when the electronic device 101 illustrated in FIG. 3A is viewed from above, a portion of the flexible printed circuit board 263 may be disposed under the second antenna module 320 (e.g., in the +z direction). For example, the flexible printed circuit board 263 may be disposed on the support 215. At least a portion of the flexible printed circuit board 263 overlapping the second antenna module 320 may be disposed between the support 215 and the second antenna module 320.

Since the flexible printed circuit board 263 and the second antenna module 320 at least partially overlap, a signal line in the flexible printed circuit board 263 and the conductive pattern 322 may overlap each other. As the signal line and the conductive pattern 322 overlap, interference between the signal line and the conductive pattern 322 may occur. For example, a short-range wireless signal transmitted and/or received through the conductive pattern 322 is induced to a signal line within flexible printed circuit boards 263 overlapping the second antenna module 320, download throughput of a high frequency band (e.g., n261 band) transmitted and/or received through the first antenna module 310 may be reduced. Due to the interference, the communication performance of the electronic device 101 may be deteriorated.

The electronic device 101 may include a conductive sheet (e.g., a conductive sheet 330 of FIG. 6A) in order to reduce interference between the flexible printed circuit board 263 and the second antenna module 320. For example, the conductive sheet 330 may include a metal (e.g., copper). For example, the conductive sheet 330 may reduce interference between the second antenna module 320 and the flexible printed circuit board 263, by being disposed between a portion of the second antenna module 320 and a portion of the flexible printed circuit board 263, which overlap with each other. For example, the conductive sheet 330 may be integrally formed with the base substrate 321, by being coupled to the base substrate 321 of the second antenna module 320. For example, the conductive sheet 330 may be disposed in an overlapping area 320*a* of the base substrate 321 overlapping the flexible printed circuit board 263. However, it is not limited thereto.

Between the second antenna module 320 and the flexible printed circuit board 263, which overlap each other, the conductive sheet 330 may be grounded to the support 215, in order to reduce the electromagnetic interaction between the signal line in the flexible printed circuit board 263 and the conductive pattern 322. For example, the conductive sheet 330 may be grounded to the support 215 through a fixing structure 340 for fixing the second antenna module 320. Interference between a signal transmitted along the flexible printed circuit board 263 and a signal transmitted and/or received through the conductive pattern 322 may be reduced by the grounded conductive sheet 330. As the interference is reduced by the conductive sheet 330, the communication performance of the electronic device 101 may be improved. The conductive sheet 330 may be referred to as a shielding sheet, a protective sheet, and/or a cover sheet, in terms of electromagnetically separating the conductive pattern 322 and the flexible printed circuit board 263 distinguished with each other.

Figure 4:
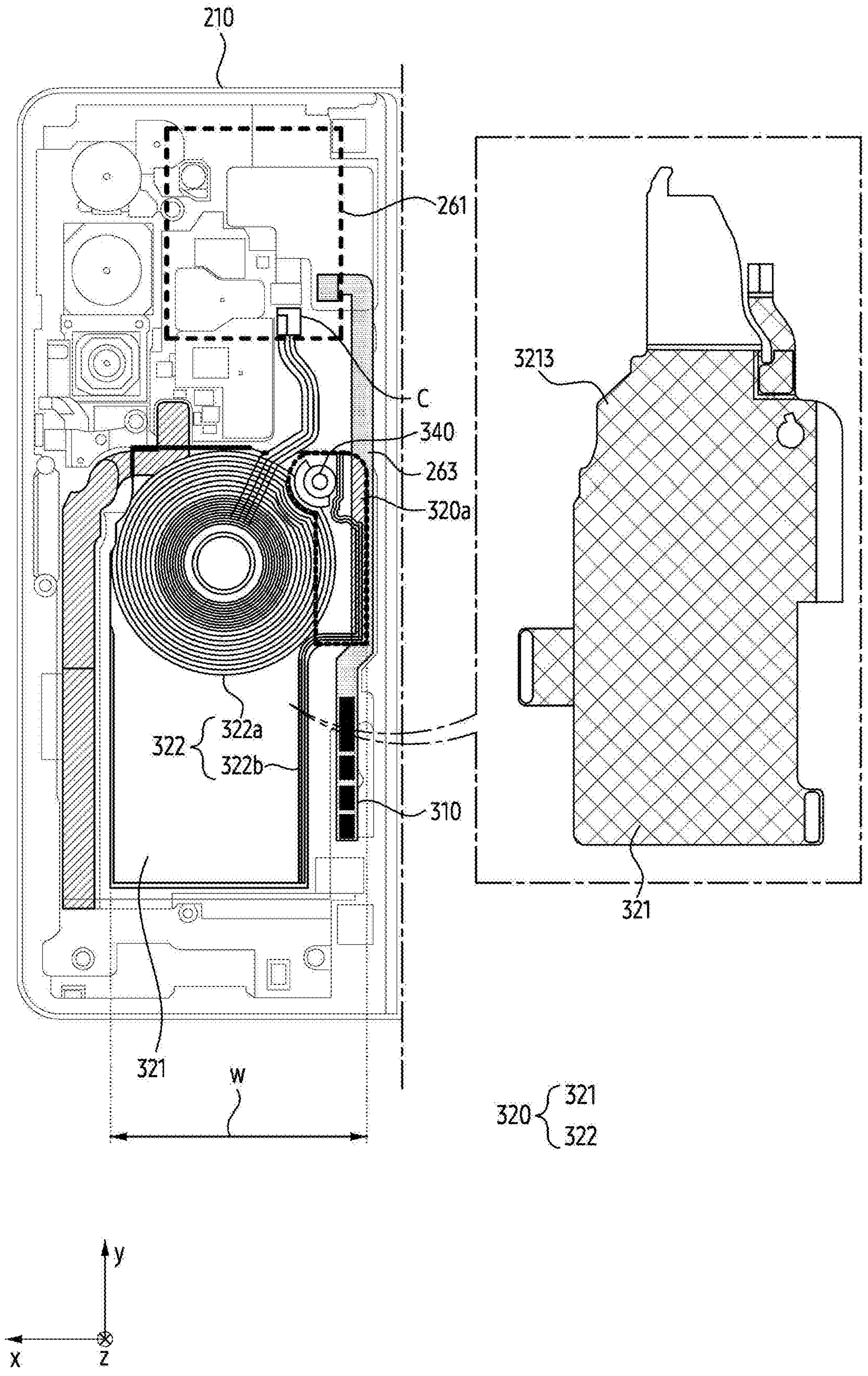
FIG. 4 illustrates a second antenna module inside a first housing according to an embodiment of the disclosure.
Figure 5A:
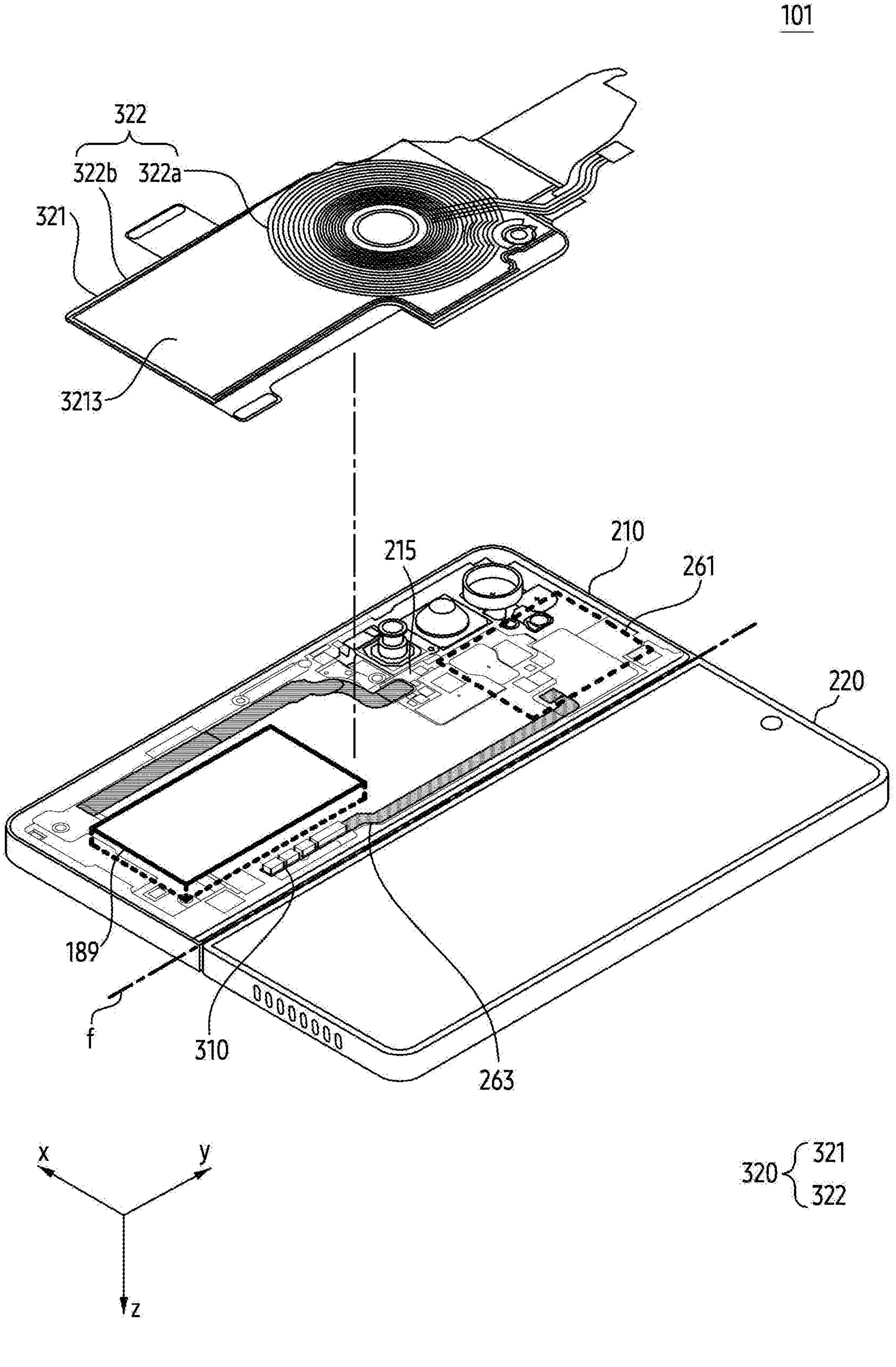
FIG. 5A is an exploded perspective view of a first housing of an electronic device according to an embodiment of the disclosure.
Figure 5B:
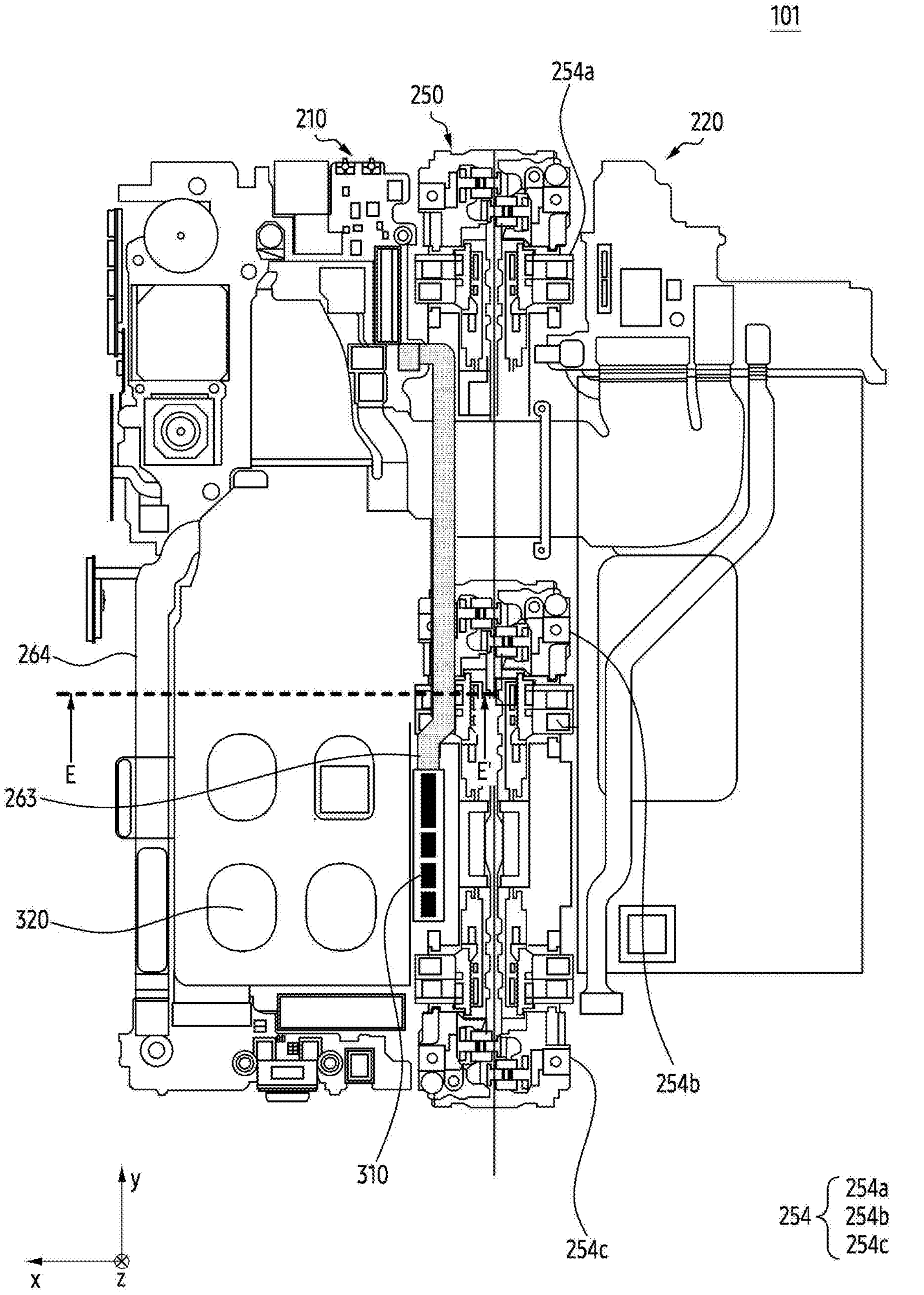
FIGS. 5B and 5C illustrate the interior of an electronic device according to an embodiment of the disclosure.
Figure 5C:
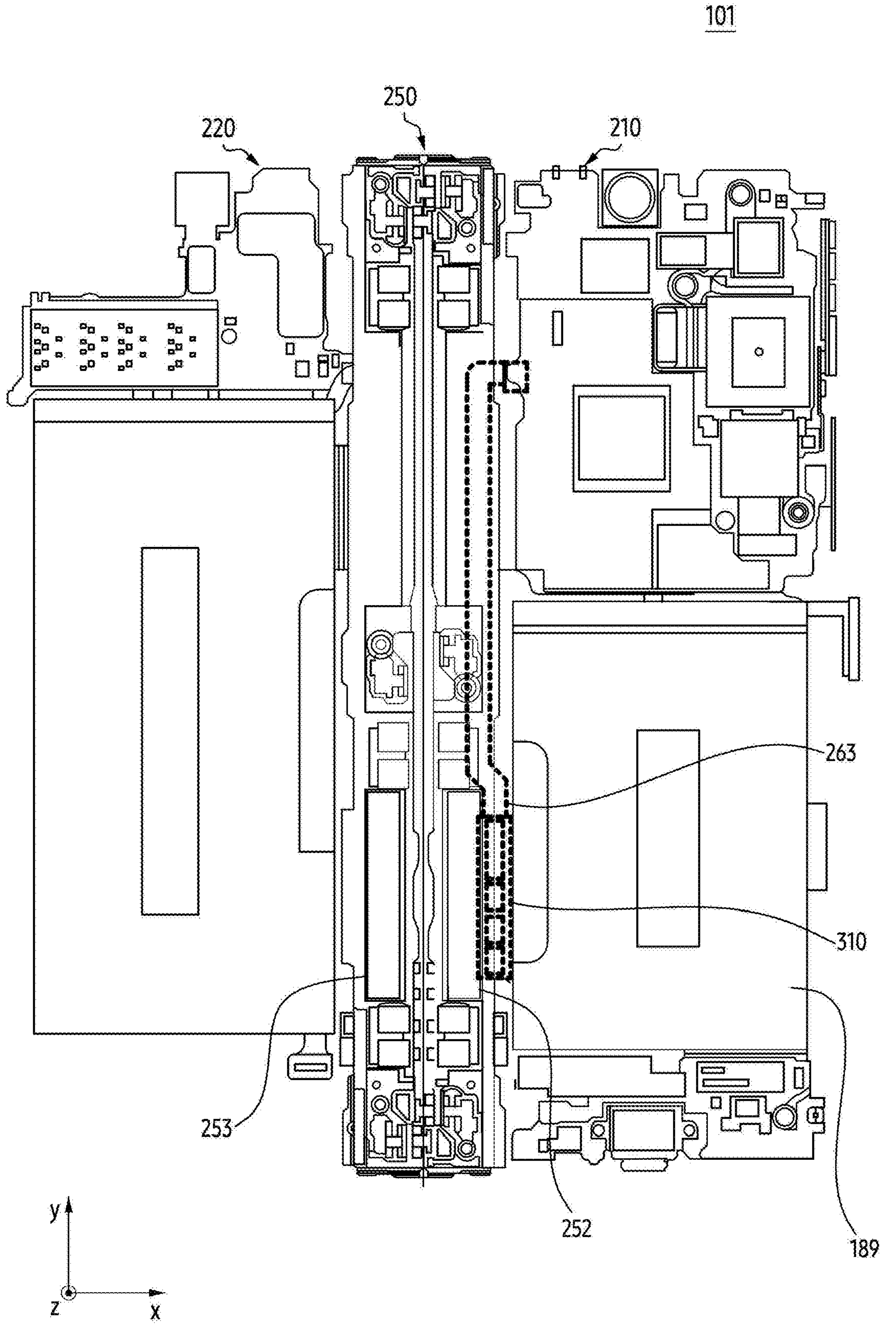

FIG. 4 illustrates a second antenna module inside a first housing according to an embodiment of the disclosure. FIG. 5A is an exploded perspective view of a first housing of an electronic device according to an embodiment of the disclosure. FIGS. 5B and 5C illustrate the interior of an electronic device according to an embodiment of the disclosure.

Referring to FIG. 4, a second antenna module 320 may include a base substrate 321 and a conductive pattern 322. At least a portion of the base substrate 321 may include a flexible printed circuit board (e.g., a flexible printed circuit board 3213 of FIG. 5A). The base substrate 321 may include a connector C connected to a printed circuit board 261. Since the connector C is connected to the printed circuit board 261, the second antenna module 320 may be electrically connected to the printed circuit board 261. At least one processor (e.g., the processor 120 of FIG. 1) and a wireless communication module (e.g., the wireless communication module 192 of FIG. 1) disposed on the printed circuit board 261 may transmit and/or receive a signal through the conductive pattern 322. For example, the signal may include a short-range wireless signal. For example, the conductive pattern 322 may be disposed on the base substrate 321. For example, the conductive pattern 322 may be an antenna radiator for transmitting and/or receiving a wireless signal and may be referred to as a winded coil to form a designated pattern.

The conductive pattern 322 may include a first conductive pattern 322*a* and a second conductive pattern 322*b*. For example, the first conductive pattern 322*a* may operate as an antenna radiator for an MST antenna (e.g., the MST antenna 207-1 of FIG. 3B) and/or a wireless charging antenna (e.g., the wireless charging antenna 197-5 of FIG. 3B). For example, the second conductive pattern 322*b* may operate as an antenna radiator for an NFC antenna (e.g., the NFC antenna 197-3 of FIG. 3B).

For example, the first conductive pattern 322*a* may be disposed to form a plurality of loops on the base substrate 321. A signal transmitted and/or received through the first conductive pattern 322*a* may be transmitted along the first conductive pattern 322*a* extending to the connector C. For example, the second conductive pattern 322*b* may be disposed outside the first conductive pattern 322*a*. A signal transmitted and/or received through the second conductive pattern 322*b* may be transmitted along the second conductive pattern 322*b* extending to the connector C. As described above, a signal transmitted and/or received through the conductive pattern 322 may be transmitted to the printed circuit board 261 along the conductive pattern 322.

In order to transmit and/or receive a short-range wireless signal between the conductive pattern 322 used as an antenna radiator and an external electronic device, a width W of the second antenna module 320 may be required to be longer than or equal to a certain length. For example, for short-range wireless communication with an external electronic device (e.g., dock or holder) disposed in a vehicle, a width W of the second antenna module 320 may be required to be longer than or equal to a certain length. When the width W of the second antenna module 320 is narrow, an area in which the conductive pattern 322 is disposed may be narrow. When the conductive pattern 322 is disposed within the narrow width W, the communication performance of the second antenna module 320 may be deteriorated. As described above, when the second antenna module 320 has the width W longer than or equal to a certain length, a space occupied by the second antenna module 320 in the first housing 210 may increase. As the space occupied by the second antenna module 320 increases, a flexible printed circuit board 263 and the second antenna module 320 may at least partially overlap.

Referring to FIGS. 5A and 5B, the flexible printed circuit board 263 may at least partially overlap the second antenna module 320. For example, an internal structure of the electronic device 101 shown in FIG. 5B illustrates a state in which the second antenna module 320 shown in FIG. 5A is disposed within the first housing 210. For example, the first antenna module 310 may be disposed between the battery 189 and the hinge structure 250. For example, the flexible printed circuit board 263 may partially overlap the hinge structure 250. The flexible printed circuit board 263 may extend between the hinge devices 254*a*, 254*b*, and 254*c* spaced apart from each other. For example, the flexible printed circuit board 263 may extend from the printed circuit board 261 to the first antenna module 310. For example, the flexible printed circuit board 263 may extend along an extending direction (e.g., y-axis) of a folding axis f.

At least a portion of the second antenna module 320 may overlap at least a portion of the flexible printed circuit board 263. After the flexible printed circuit board 263 is connected to each of the printed circuit board 261 and the first antenna module 310 is disposed on a support 215, the second antenna module 320 may be disposed on the support 215. A portion of the second antenna module 320 may be located over a portion of the flexible printed circuit board 263 (e.g., in the −z direction). For example, since a portion of the conductive pattern 322 may be disposed within a portion of the second antenna module 320 overlapping the flexible printed circuit board 263, the conductive pattern 322 and a signal line within the flexible printed circuit board 263 may overlap each other.

A conductive sheet 330 may be disposed within a portion of the second antenna module 320 overlapping a portion of the flexible printed circuit board 263. The conductive sheet 330 may be disposed between the second antenna module 320 and the flexible printed circuit board 263 overlapping with each other. The conductive sheet 330 may be included within a portion of the base substrate 321 overlapping a portion of the flexible printed circuit board 263. The conductive sheet 330 may reduce electromagnetic interaction between the second antenna module 320 and the flexible printed circuit board 263 overlapping with each other, by being grounded to the support 215 through a fixing structure 340. The grounded conductive sheet 330 may reduce the electromagnetic interaction by electromagnetically shielding the second antenna module 320 and the flexible printed circuit board 263 overlapping with each other. Deterioration in the performance of the first antenna module 310 may be reduced by reducing the interference between a signal transmitted and/or received through the conductive pattern 322 of the second antenna module 320 and a signal transmitted along a signal line of the flexible printed circuit board 263, by the conductive sheet 330.

Figure 6A:
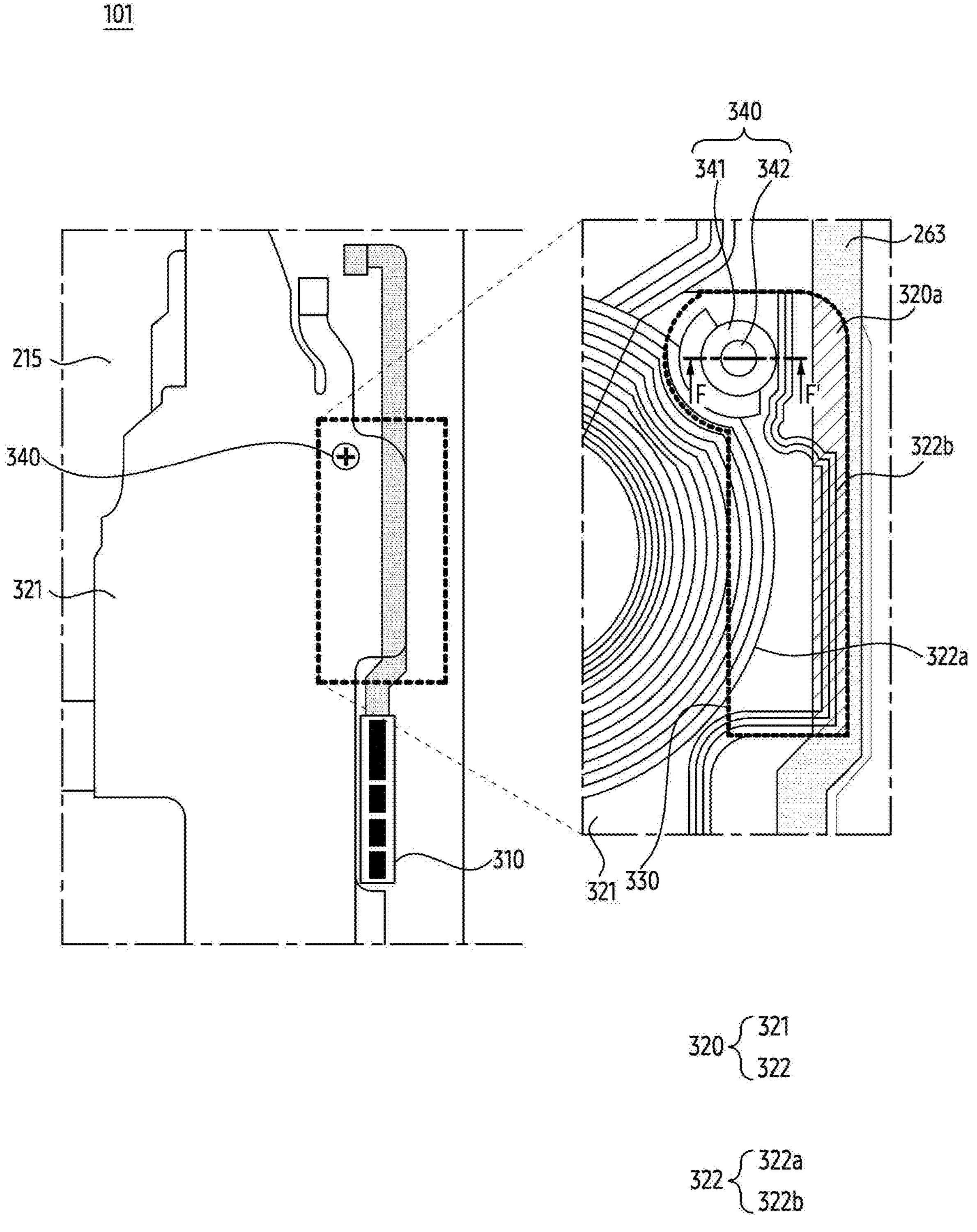
FIG. 6A illustrates a portion of an electronic device according to an embodiment of the disclosure.
Figure 6B:
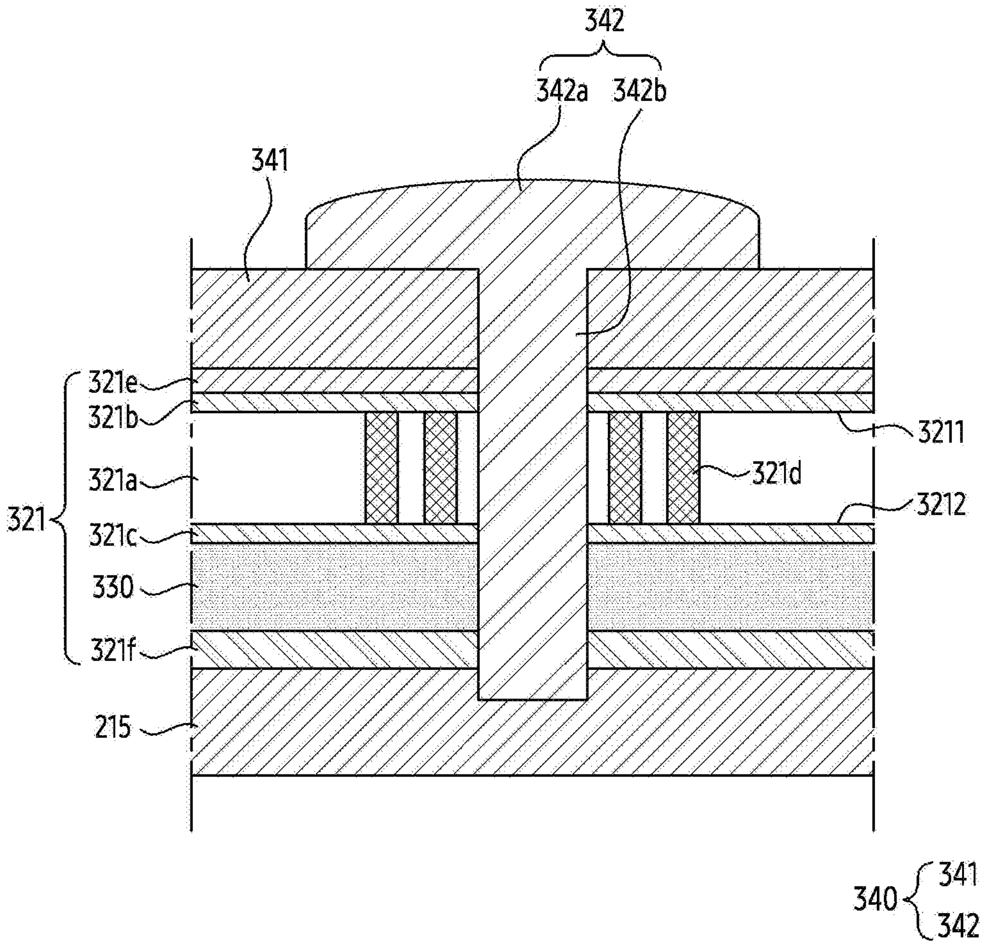
FIG. 6B is a cross-sectional view of an electronic device of FIG. 6A cut along line F-F' according to an embodiment of the disclosure.

FIG. 6A illustrates a portion of an electronic device according to an embodiment of the disclosure. FIG. 6B is a cross-sectional view of an electronic device of FIG. 6A cut along line F-F' according to an embodiment of the disclosure.

Referring to FIGS. 6A and 6B, an electronic device 101 may include a fixing structure 340. The fixing structure 340 may fix a second antenna module 320 on a support 215 and ground a conductive sheet 330 to the support 215.

In order to fix a second antenna module 320 to the support 215, the fixing structure 340 may penetrates a base substrate 321 and the conductive sheet 330, and may be inserted at least partially into the support 215.

The fixing structure 340 may include a washer 341 and a screw 342. The washer 341 may include an opening and may be attached to the base substrate 321. The screw 342 may penetrate the opening of the washer 341, the base substrate 321, and the conductive sheet 330, and may be inserted at least partially into the support 215. The screw 342 may include a head 342*a* having a diameter larger than a diameter of the opening. The screw 342 may press the washer 341 by the head 342*a*. For example, the washer 341 may include stainless steel. Since the base substrate 321 is fixed on the support 215 by the fixing structure 340, the second antenna module 320 may be fixed on the support 215. For example, the head 342*a* may be referred to as a flange.

A portion of the conductive pattern 322 may be disposed on an overlapping area 320*a* of the base substrate 321 overlapping the flexible printed circuit board 263. As described above, in order to secure the width (e.g., the width W of FIG. 4) of the second antenna module 320 used for short-range wireless communication, a portion of the conductive pattern 322 may be disposed close to a periphery of the base substrate 321. A portion of the second conductive pattern 322*b* disposed close to a periphery of the base substrate 321 may be disposed on the overlapping area 320*a*, by being disposed outside the first conductive pattern 322*a*. However, it is not limited thereto. The first conductive pattern 322*a* may at least partially overlap the flexible printed circuit board 263. The conductive pattern 322 disposed on the overlapping area 320*a* may at least partially overlap a signal line in the flexible printed circuit board 263. The fixing structure 340 inserted into the base substrate 321 may overlap the conductive sheet 330 and may be spaced apart from the flexible printed circuit board 263. As the fixing structure 340 is spaced apart from the flexible printed circuit board 263, the fixing structure 340 inserted into the support 215 may be spaced apart from the signal line in the flexible printed circuit board 263. A position where the fixing structure 340 is inserted may be located between the first conductive pattern 322*a* and the second conductive pattern 322*b*, so that the fixing structure 340 does not interfere with a structure of the conductive pattern 322.

Referring to FIG. 6B, the fixing structure 340 may be coupled to a surface of the base substrate 321. For example, the washer 341 may be mounted on a surface of a first cover layer (e.g., solder resist) 321*e* that forms the outermost layer of the base substrate 321 by a surface mounting technology (SMT). A body 342*b* of the screw 342 extending from the head 342*a* may be inserted into the opening of the washer 341 to penetrate the base substrate 321 and the conductive sheet 330, and at least partially inserted into the support 215. For example, when the conductive sheet 330 is included in the base substrate 321 so that the conductive sheet 330 and the base substrate 321 are integrally formed, the body 342*b* of the screw 342 may penetrate a second cover layer 321*f* of the base substrate 321 disposed under the conductive sheet 330 and may be at least partially inserted into the support 215. However, it is not limited thereto.

The base substrate 321 may include a flexible printed circuit board including a plurality of stacked layers. For example, the base substrate 321 may include a dielectric layer 321*a*, a first conductive layer 321*b*, and a second conductive layer 321*c*. The first conductive layer 321*b* and the second conductive layer 321*c* may be disposed with the dielectric layer 321*a* interposed therebetween. The first conductive layer 321*b* may be disposed on a surface 3211 of the dielectric layer 321*a*. The second conductive layer 321*c* may be disposed on another surface 3212 of the dielectric layer 321*a* opposite to the surface 3211. The first conductive layer 321*b* and the second conductive layer 321*c* may be electrically connected through a conductive via 321*d* formed at the dielectric layer 321*a*. For example, the conductive sheet 330 may be electrically connected to the second conductive layer 321*c* by contacting the second conductive layer 321*c*. The first conductive layer 321*b* may be electrically isolated from the conductive pattern 322. For example, the conductive pattern 322 may not be electrically connected to the ground through the first conductive layer 321*b* grounded to the support 215, but may be electrically connected to a ground layer (not shown) of the base substrate 321.

The base substrate 321 and the conductive sheet 330 may be grounded to the support 215 through the fixing structure 340. The fixing structure 340 may penetrate the first conductive layer 321*b*, the dielectric layer 321*a*, the second conductive layer 321*c*, and the conductive sheet 330 and be inserted at least partially into the support 215. For example, the fixing structure 340 may include a conductive material (e.g., metal). The first conductive layer 321*b*, the second conductive layer 321*c*, and the conductive sheet 330 may be grounded by being electrically connected to the support 215 through the fixing structure 340 inserted at least partially into the support 215. As the conductive sheet 330 disposed between the second antenna module 320 and the flexible printed circuit board 263 is grounded to the support 215 through the fixing structure 340, electromagnetic interaction between the second antenna module 320 and the flexible printed circuit board 263 may be reduced.

Interference of a signal transmitted and/or received through the conductive pattern 322 with respect to a signal transmitted through the flexible printed circuit board 263 may be reduced, by the conductive sheet 330 disposed between the flexible printed circuit board (e.g., the flexible printed circuit board 263 of FIG. 6A) and the conductive pattern (e.g., the conductive pattern 322 of FIG. 6A) overlapping with each other. According to an embodiment of the disclosure, the communication performance of the first antenna module 310 and the second antenna module 320 may be improved. For example, when a signal transmitted and/or received through the first antenna module 310 is transmitted along the flexible printed circuit board 263, the conductive sheet 330 may improve the communication performance of the electronic device 101 by reducing a signal transmitted and/or received through the conductive pattern 322 from being induced to the first antenna module 310.

The structure of the base substrate 321 illustrated in FIG. 6B is not limited to the structure illustrated in FIG. 6B. For example, the second conductive layer 321*c* may be omitted, and the conductive sheet 330 may be in contact with the first conductive layer 321*b*. In addition to this, various structures may be possible.

Figure 7A:
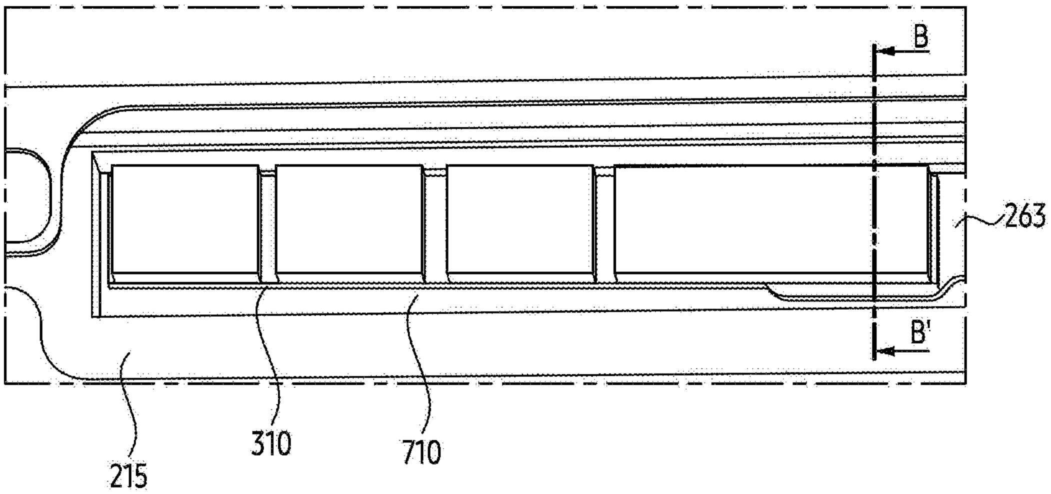
FIG. 7A illustrates a portion of a first housing in which a first antenna module is disposed according to an embodiment of the disclosure.
Figure 7B:
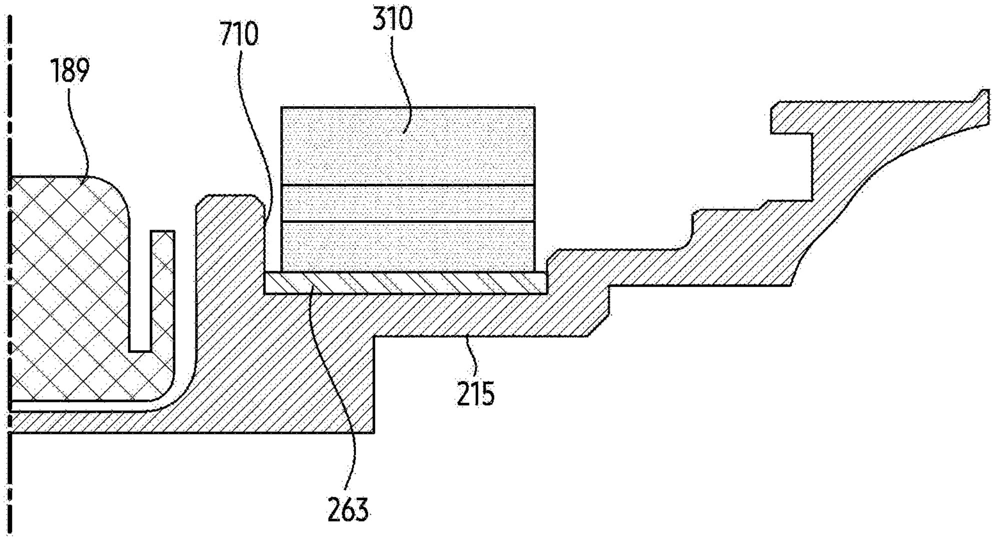
FIG. 7B is a cross-sectional view of a first housing of FIG. 7A cut along line G-G' according to an embodiment of the disclosure.

FIG. 7A illustrates a portion of a first housing in which a first antenna module is disposed according to an embodiment of the disclosure. FIG. 7B is a cross-sectional view of a first housing of FIG. 7A cut along line G-G' according to an embodiment of the disclosure.

Referring to FIGS. 7A and 7B, a support 215 may include a recess portion 710 in which at least a portion of first antenna module 310 may be accommodated. The recess portion 710 may be formed by recessing a portion of the support 215. For example, the recess portion 710 may be referred to as a groove, a depression part, a stepped portion, and/or a seating portion.

Since the first antenna module 310 has a constant thickness, when disposed on a surface of the support 215, a thickness of the first housing 210 may increase. When the thickness of the first housing 210 increases, it may be difficult for a user to hold and use the electronic device 101 by hand. As the support 215 includes the recess portion 710 in which at least a portion of the first antenna module 310 is disposed, and at least a portion of the first antenna module 310 is disposed within the recess portion 710, the thickness of the first housing 210 may be reduced. For example, a depth of the recess portion 710 may be less than or equal to the thickness of the first antenna module 310, but is not limited thereto.

At least a portion of the first antenna module 310 may be accommodated within the recess portion 710. The flexible printed circuit board 263 connected to the first antenna module 310 may be connected to the first antenna module 310 at least partially accommodated within the recessed portion 710. A portion of the flexible printed circuit board 263 may be disposed within the recess portion 710, and the first antenna module 310 may be disposed on a portion of the flexible printed circuit board 263 seated within the recess portion 710. A portion of the recess portion 710 connected to the first antenna module 310 may be located under the first antenna module 310 in the recess portion 710.

The electronic device 101 may include a hinge structure (e.g., a hinge structure 250 of FIG. 8A) to be described later. The hinge structure 250 may rotatably connect the first housing 210 and the second housing 220. The hinge structure 250 may include a structure for rotatably connecting the first housing 210 and the second housing 220. When the electronic device 101 is changed from a folding state to an unfolding state, or the electronic device 101 is changed from the unfolding state to the folding state, the structure may operate. Since at least a portion of the first antenna module 310 is accommodated in the recess portion 710, a space for operation of the hinge structure 250 may be secured. As the first antenna module 310 is at least partially accommodated within the recess portion 710 formed at the support 215, the first antenna module 310 may not interfere with the hinge structure 250 for rotating operation.

Figure 8A:
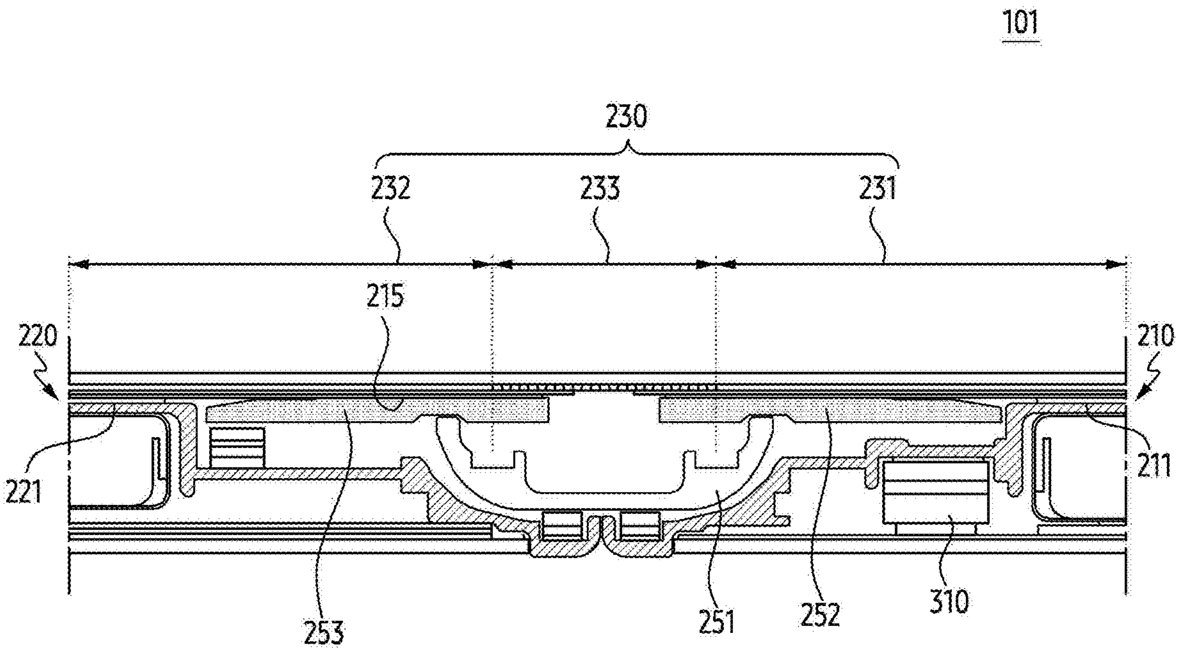
FIG. 8A is a portion of a cross-sectional view of an electronic device in an unfolding state cut along line A-A' of FIG. 2D, according to an embodiment of the disclosure.
Figure 8B:
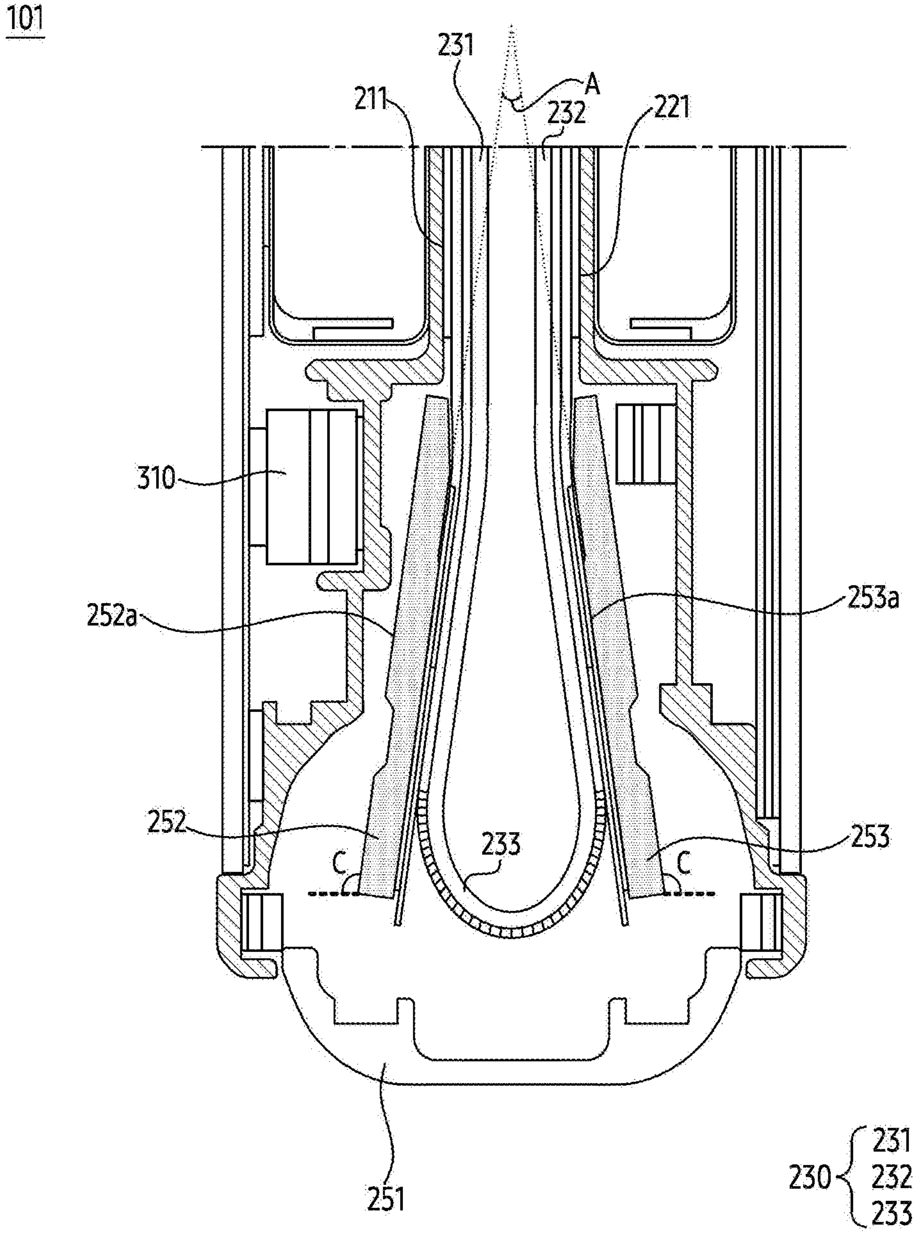
FIG. 8B is a portion of a cross-sectional view of an electronic device in a folding state cut along line A-A' of FIG. 2D, according to an embodiment of the disclosure.
Figure 8C:
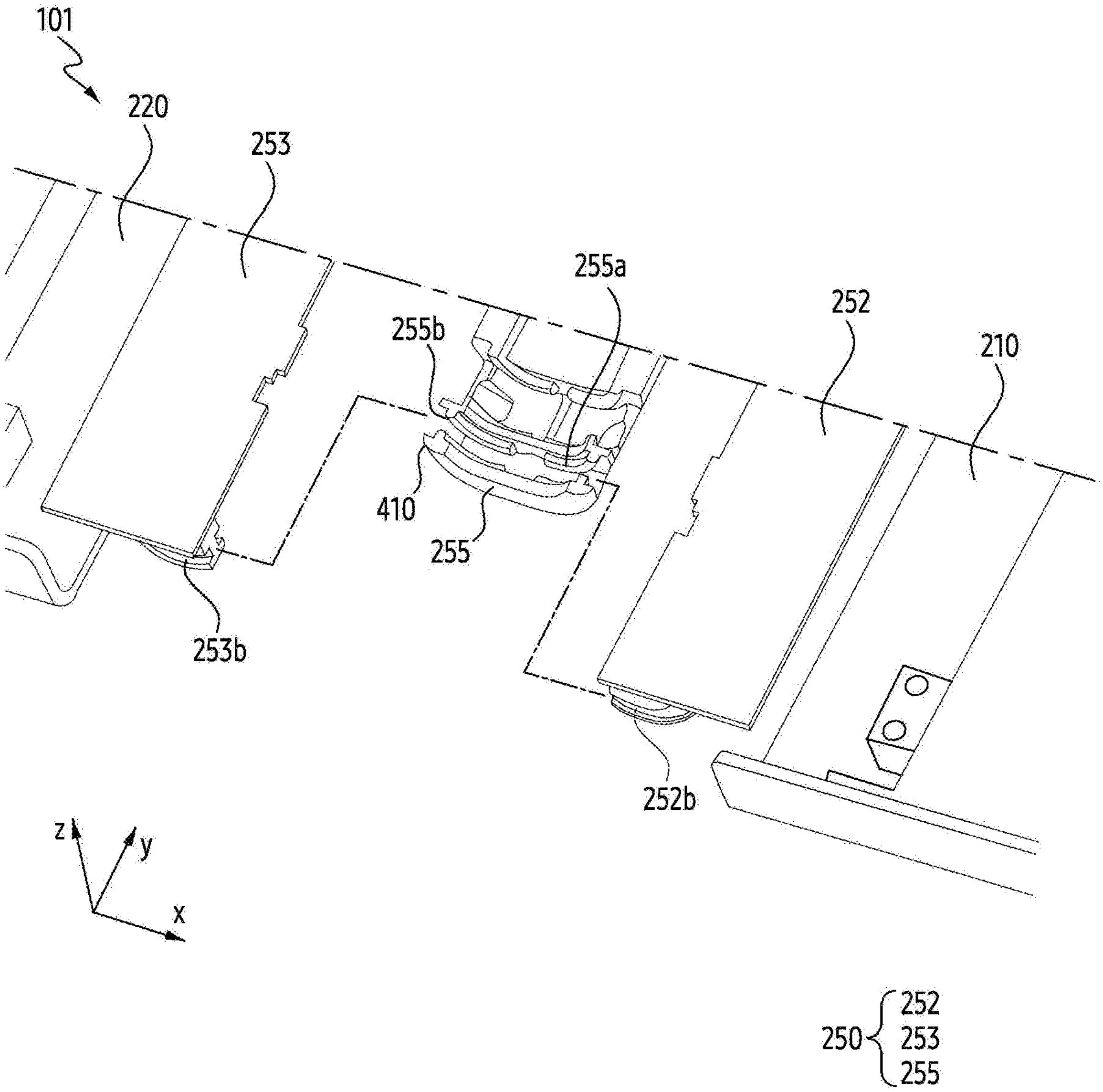
FIG. 8C is an exploded view of a hinge structure of an electronic device according to an embodiment of the disclosure.

FIG. 8A is a portion of a cross-sectional view of an electronic device in an unfolding state cut along line A-A' of FIG. 2D, according to an embodiment of the disclosure. FIG. 8B is a portion of a cross-sectional view of an electronic device in a folding state cut along line A-A' of FIG. 2D, according to an embodiment of the disclosure. FIG. 8C is an exploded view of a hinge structure of an electronic device according to an embodiment of the disclosure.

Referring to FIGS. 8A and 8B, an electronic device 101 may include a display 230. For example, the display 230 may be referred to as a flexible display 230 that is at least partially bendable.

The display 230 may be disposed on a first housing 210 and a second housing 220. The display 230 may include a first display area 231, a second display area 232, and a third display area 233. The first display area 231 may be disposed on the first housing 210. The second display area 232 may be disposed on the second housing 220. The third display area 233 may be disposed between the first display area 231 and the second display area 232. The third display area 233 may be disposed along a folding axis f. The third display area 233 may be deformed based on the second housing 220 rotated with respect to the first housing 210. In an unfolding state in which a direction in which the first display area 231 faces and a direction in which the second display area 232 faces are the same, the third display area 233 may be substantially flat. In a folding state in which a direction in which the first display area 231 faces and a direction in which the second display area 232 faces are opposite to each other, the third display area 233 may be bent.

The hinge structure 250 may include a hinge cover 251, a first hinge plate 252, and a second hinge plate 253. The first hinge plate 252 may be operably coupled to the first housing 210. For example, 'the first hinge plate 252 is operably coupled to the first housing 210' may indicate a structure in which the first hinge plate 252 and the first housing 210 are directly coupled. For example, 'the first hinge plate 252 is operably coupled to the first housing 210' may indicate a structure in which the first hinge plate 252 and the first housing 210 are coupled through at least one component. For example, an operation of the first hinge plate 252 may cause an operation of the first housing 210. For example, the second hinge plate 253 may be operably coupled to the second housing 220. For example, the second hinge plate 253 may be rotatable with respect to the first hinge plate 252. When the second hinge plate 253 is rotated with respect to the first hinge plate 252, the second housing 220 may be rotated with respect to the first housing 210.

The hinge structure 250 may be configured to change the electronic device 101 from the folding state to the unfolding state, or to change the electronic device 101 from the unfolding state to the folding state. For example, the hinge structure 250 may be configured to change the electronic device 101 from a folding state in which a first direction in which the first display area 231 faces is opposite to a second direction in which the second display area 232 faces to an unfolding state in which the first direction and the second direction are the same. The hinge structure 250 may maintain the electronic device 101 in an intermediate state between the folding state and the unfolding state.

Referring to FIGS. 8A and 8B, when the state of the electronic device 101 is changed, a rotation angle of the first hinge plate 252 and a rotation angle of the second hinge plate 253 may be different from a rotation angle of the first housing 210 and a rotation angle of the second housing 220.

Referring to FIG. 8A, when the electronic device 101 is in the unfolding state, the first hinge plate 252 and the second hinge plate 253 may be disposed on substantially the same plane. When the electronic device 101 is in the unfolding state, the first housing 210 and the second housing 220 may be disposed on substantially the same plane. Since a surface 252*a* of the first hinge plate 252 and a surface 253*a* of the second hinge plate 253 face substantially the same direction in the unfolding state, an angle between the surface 252*a* and the surface 253*a* may be substantially about 180 degrees. Since the first surface of the first housing 210 and the third surface of the second housing 220 face substantially the same direction in the unfolding state, an angle between the first surface and the third surface may be substantially about 180 degrees.

Referring to FIG. 8B, when the electronic device 101 is changed from the unfolding state to the folding state, a rotation angle of the first housing 210 and/or a rotation angle of the second housing 220 may be different from a rotation angle of the first hinge plate 252 and/or a rotation angle of the second hinge plate 253. According to a difference in the rotation angle, the third display area 233 of the display 230 may be bent in a waterdrop-shape in the folding state.

In the folding state, the second hinge plate 253 may have a slope without being parallel to the first hinge plate 252. In the folding state, a direction in which the surface 252*a* of the first hinge plate 252 faces and a direction in which the surface 253*a* of the second hinge plate 253 faces may not face opposite directions, but may have a slope with respect to each other. An angle (e.g., an angle A in FIG. 8B) between the surface 252*a* of the first hinge plate 252 and the surface 253*a* of the second hinge plate 253 may be an acute angle less than 90 degrees.

When the electronic device 101 is changed from the unfolding state to the folding state, the rotation angle of the first housing 210 and the rotation angle of the second housing 220 may be within a first angle range. The first housing 210 and/or the second housing 220 may rotate to the folding state in which the first housing 210 and the second housing 220 are disposed parallel to each other from the unfolding state in which the first housing 210 and the second housing 220 are disposed parallel on substantially the same plane. In the unfolding state, an angle between the first surface 211 of the first housing 210 and the third surface 221 of the second housing 220 may be about 180 degrees. Since the first surface 211 of the first housing 210 and the third surface 221 of the second housing 220 are parallel to each other in the folding state, the angle between the first surface 211 and the third surface 221 may be substantially about 0°.

When the electronic device 101 is changed from the unfolding state to the folding state by an external force (e.g., a force applied by a user), the second housing 220 may be stacked with the first housing 210 by rotating by about 180 degrees with respect to the first housing 210. When the electronic device 101 is changed from the unfolding state to the folding state, the sum of the rotation angle of the first housing 210 and the rotation angle of the second housing 220 may be about 180 degrees. For example, a first angle range may be about 0 degrees to about 180 degrees.

When the electronic device 101 is changed from the unfolding state to the folding state, the rotation angle of the first hinge plate 252 and the rotation angle of the second hinge plate 253 may be within a second angle range greater than the first angle range. For example, the first hinge plate 252 and the second hinge plate 253 may rotate to the folding state in which the first hinge plate 252 and the second hinge plate 253 are inclined with respect to each other from the unfolding state in which the first hinge plate 252 and the second hinge plate 253 are disposed parallel to each other on substantially the same plane. In the unfolding state, an angle between a surface 252*a* of the first hinge plate 252 and a surface 253*a* of the second hinge plate 253 may be about 180 degrees. In the folding state, a surface 252*a* of the first hinge plate 252 and a surface 253*a* of the second hinge plate 253 may form an acute angle (e.g., an angle A of FIG. 8B) with respect to each other.

When the electronic device 101 is changed from the unfolding state to the folding state, each of the first hinge plate 252 and the second hinge plate 253 may have a slope with respect to each other by rotating by an angle greater than 90 degrees (e.g., an angle C of FIG. 8B). For example, as illustrated in FIG. 8B, when the electronic device 101 is changed from the unfolding state to the folding state, each of the first hinge plate 252 and the second hinge plate 253 may rotate x degrees (e.g., 100 degrees) greater than 90 degrees. An angle between a surface 252*a* of the first hinge plate 252 and a surface 253*a* of the second hinge plate 253 may be 2×-180 degrees (e.g., 20 degrees). When the electronic device 101 is changed from the unfolding state to the folding state, the sum of the rotation angle of the second hinge plate 253 and the rotation angle of the second hinge plate 253 may be greater than 180 degrees. For example, the second angle range may be about 0 degrees to about 200 degrees. However, it is not limited thereto.

The above-described rotation operation of the first hinge plate 252 and the second hinge plate 253 may be implemented through the hinge structure 250 illustrated in FIG. 8C. Referring to FIG. 8C, the hinge structure 250 may include a first hinge plate 252, a second hinge plate 253, and a hinge bracket 255. The first hinge plate 252 and the second hinge plate 253 may be coupled to the hinge bracket 255.

The hinge bracket 255 may provide a rotation axis of the first hinge plate 252 and the second hinge plate 253. The hinge bracket 255 may include a first guide groove 255*a* to which the first hinge plate 252 is slidably connected and a second guide groove 255*b* to which the second hinge plate 253 is slidably connected. The first hinge plate 252 may include a first coupling portion 252*b* inserted into the first guide groove 255*a* and slidable within the first guide groove 255*a*. The second hinge plate 253 may include a second coupling portion 253*b* inserted into the second guide groove 255*b* and slidable within the second guide groove 255*b*. The first hinge plate 252 may slide along the first guide groove 255*a* through the first coupling portion 252*b*, and the second hinge plate 253 may slide along the second guide groove 255*b* through the second coupling part 253*b*. Since the first guide groove 255*a* and the second guide groove 255*b* have a curvature, the first coupling part 252*b* and the second coupling part 253*b*may form a rotation angle while sliding.

A typical hinge does not change a rotation axis when rotating, and may rotate with respect to a constant rotation axis. In contrast, since the first hinge plate 252 and the second hinge plate 253 rotate while sliding along the first guide groove 255*a* and the second guide groove 255*b*, a rotation axis may be changed. For example, as the first hinge plate 252 slides along the first guide groove 255*a* and the second hinge plate 253 slides along the second guide groove 255*b*, a gap between the first hinge plate 252 and the second hinge plate 253 may become distant. As the gap between the first hinge plate 252 and the second hinge plate 253 become distant, the first hinge plate 252 and the second hinge plate 253 may have a slope with respect to each other, in a state of moving fully along the first guide groove 255*a* and the second guide groove 255*b*.

The electronic device 101 may be changed from the unfolding state to the folding state by movement of the first hinge plate 252 and/or the second hinge plate 253. Since the rotation angle range of the first hinge plate 252 and the second hinge plate 253 and the rotation angle range of the first housing 210 and the second housing 220 are different, the electronic device 101 according to an embodiment may provide a structure in which a curvature change of the flexible display 230 is gentle in the folding state. In the folding state, when the first hinge plate 252 and the second hinge plate 253 face each other, a curvature of the flexible display 230 supported by the first hinge plate 252 and the second hinge plate 253 may be changed rapidly between the first hinge plate 252 and the second hinge plate 253. In the folding state, since the first hinge plate 252 and the second hinge plate 253 are inclined with respect to each other, the curvature change of the flexible display 230 may be gentle. Since the curvature of the flexible display 230 is changed gently, damage to the flexible display 230 may be reduced. For example, in the folding state, a formation of wrinkles in an area where the flexible display 230 is folded (e.g., the third display area 233) may be reduced.

Figure 9A:
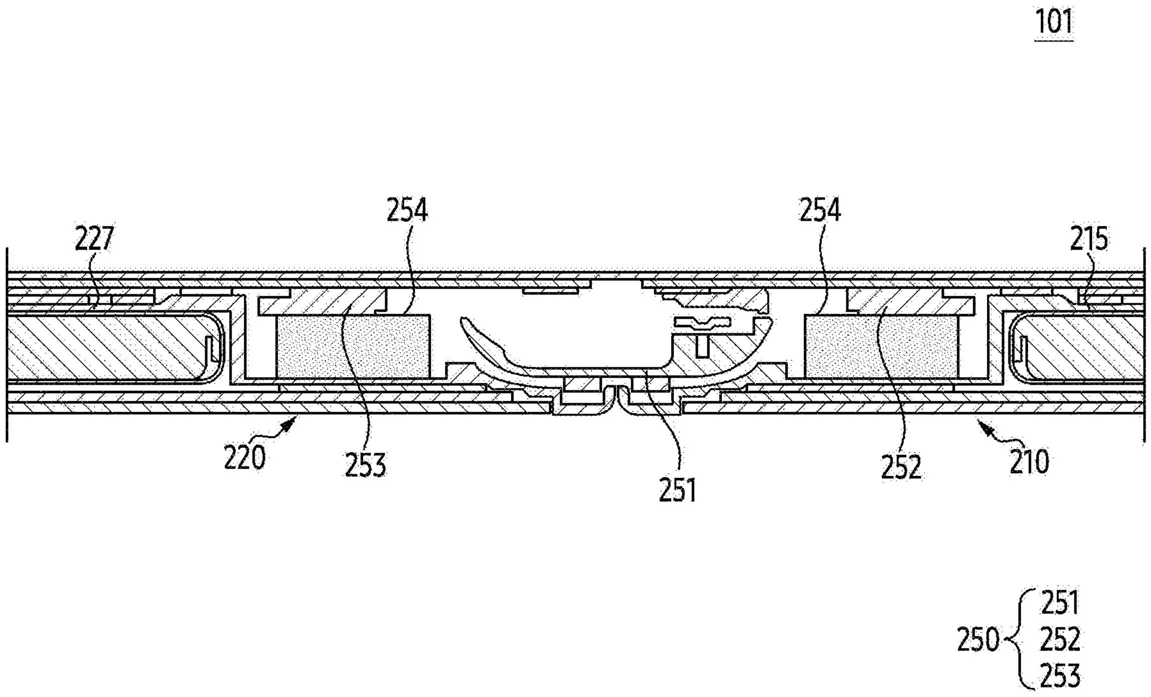
FIG. 9A is a cross-sectional view of an electronic device of FIG. 2D cut along line B-B' according to an embodiment of the disclosure.
Figure 9B:
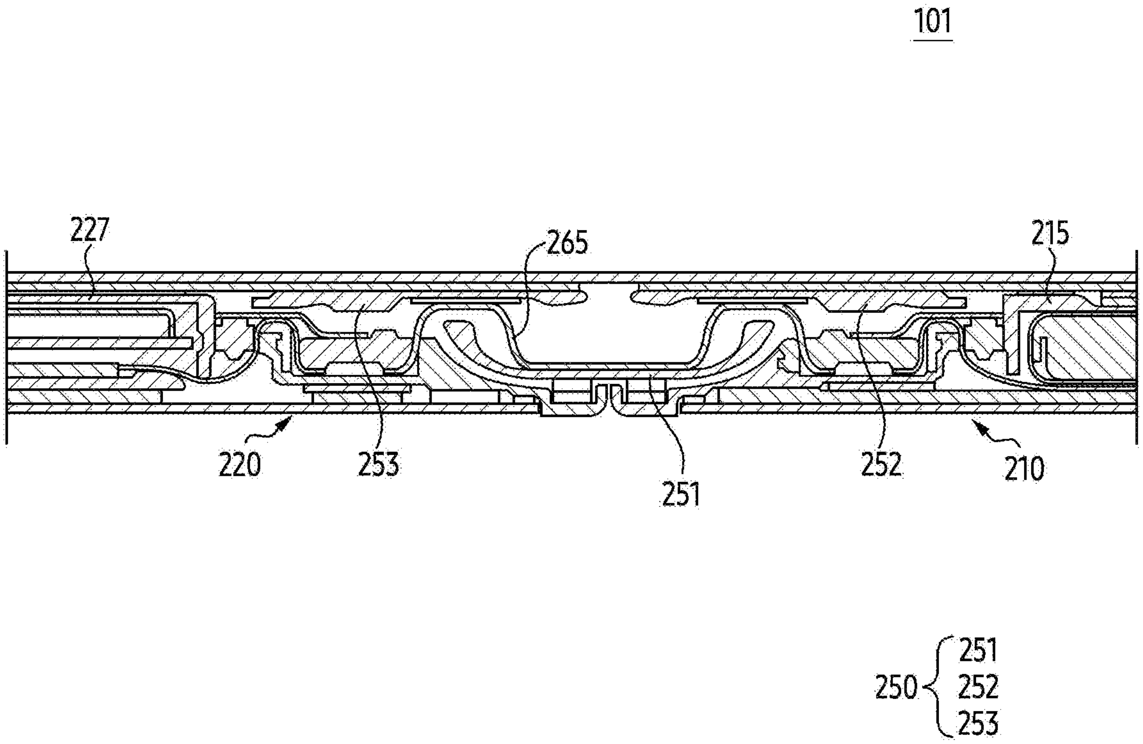
FIG. 9B is a cross-sectional view of an electronic device of FIG. 2D cut along line C-C' according to an embodiment of the disclosure.
Figure 9C:
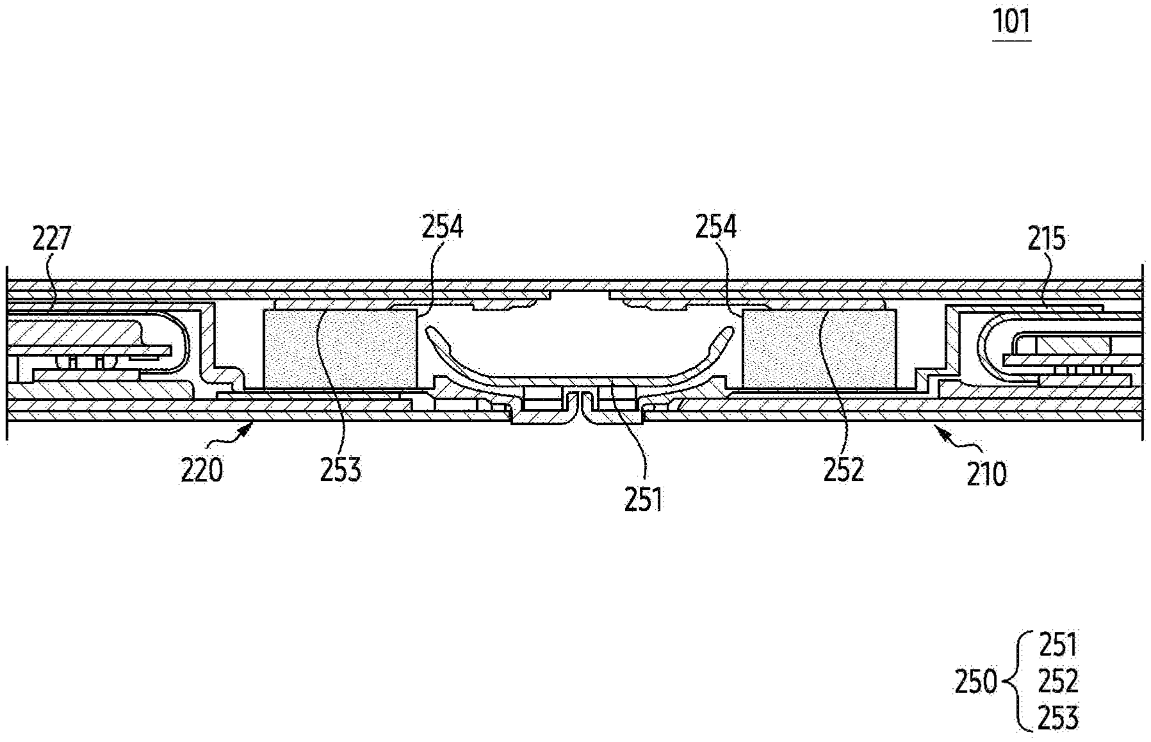
FIG. 9C is a cross-sectional view of an electronic device of FIG. 2D cut along line D-D' according to an embodiment of the disclosure.

FIG. 9A is a cross-sectional view of an electronic device of FIG. 2D cut along line B-B' according to an embodiment of the disclosure. FIG. 9B is a cross-sectional view of an electronic device of FIG. 2D cut along line C-C' according to an embodiment of the disclosure. FIG. 9C is a cross-sectional view of an electronic device of FIG. 2D cut along line D-D' according to an embodiment of the disclosure.

Referring to FIGS. 9A, 9B and 9C, a portion of a flexible printed circuit board 265 electrically connecting a first printed circuit board (e.g., a first printed circuit board 261 of FIG. 2C) and a second printed circuit board (e.g., the second printed circuit board 262 of FIG. 2C) may pass inside the hinge structure 250. For example, an end of the flexible printed circuit board 265 may be coupled to the first printed circuit board 261, and another end of the flexible printed circuit board 265 may be coupled to the second printed circuit board 262. An extension portion between the end and the other end may be disposed across between the hinge plates 252 and 253 and the hinge cover 251. For example, the flexible printed circuit board 265 may pass through a spaced space between the first hinge device 254*a* and the second hinge device 254*b*. Referring to FIG. 9B, the flexible printed circuit board 265 may be partially bent by an inner structure of the first housing 210 and an inner structure of the second housing 220 in the unfolding state.

Figure 10A:
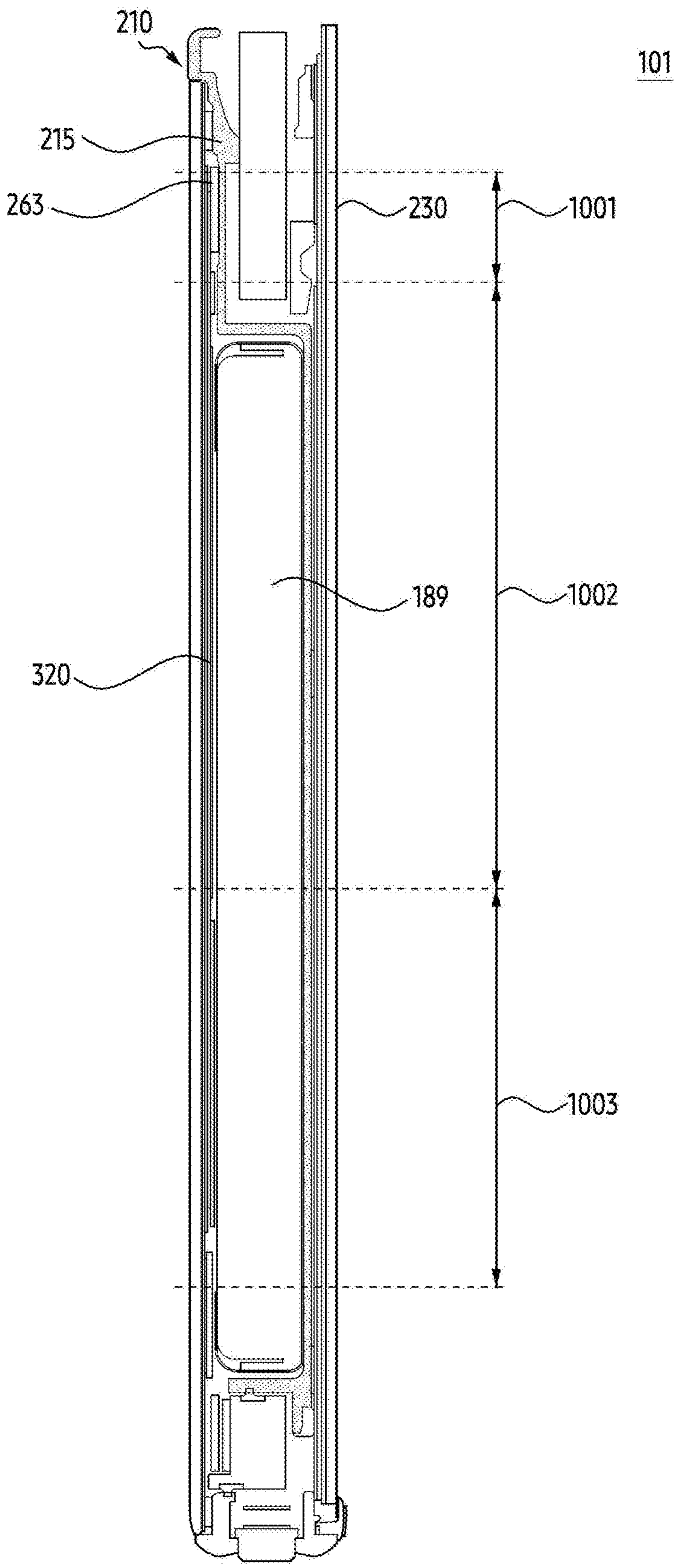
FIG. 10A is a cross-sectional view of an electronic device of FIG. 5B cut along line E-E' according to an embodiment of the disclosure.
Figure 10B:
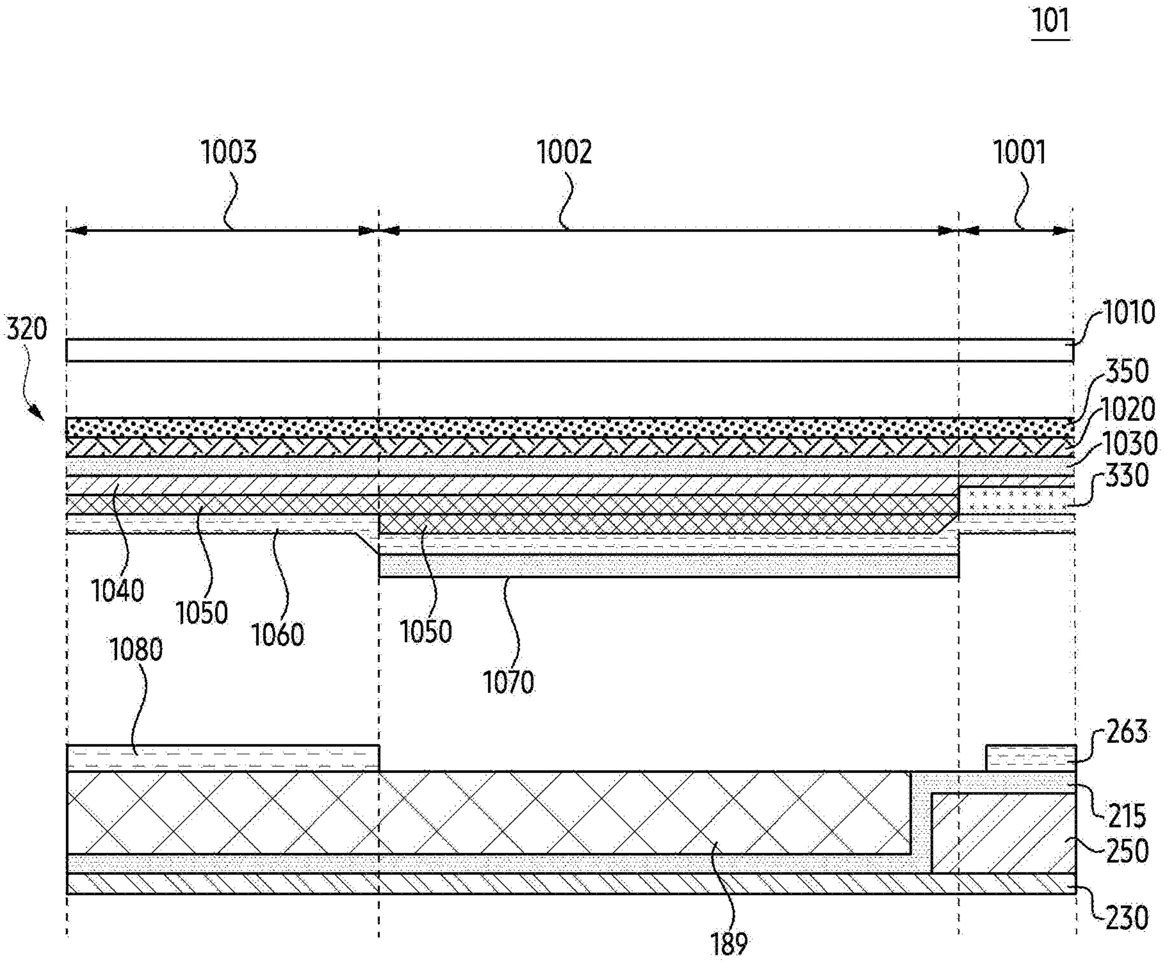
FIG. 10B is an exploded view of a cross section of an electronic device of FIG. 5B cut along line E-E' according to an embodiment of the disclosure.

FIG. 10A is a cross-sectional view of an electronic device of FIG. 5B cut along line E-E' according to an embodiment of the disclosure. FIG. 10B is an exploded view of a cross section of an electronic device of FIG. 5B cut along line E-E' according to an embodiment of the disclosure.

Referring to FIGS. 10A and 10B, a second antenna module 320 may at least partially overlap a flexible printed circuit board 263. For example, a first housing 210 may be divided into a first area 1001, a second area 1002, and a third area 1003.

In the first area 1001, the second antenna module 320 and the flexible printed circuit board 263 may at least partially overlap. In the third area 1003, the second antenna module 320 may at least partially overlap a flexible printed circuit board 1080 electrically connected to a connector connected to a battery 189 and/or an external electronic device (e.g., USB). The second area 1002 may be located between the first area 1001 and the third area 1003. In the second area 1002, the second antenna module 320 may not overlap the flexible printed circuit board 263 and the flexible printed circuit board 1080. In the second area 1002, the battery 189 may not overlap flexible printed circuit boards 263 and 1080.

Referring to FIG. 10B, the flexible printed circuit board 263 may be disposed on a first support 215. In the first area 1001, the second antenna module 320 may at least partially overlap the flexible printed circuit board 263. A conductive sheet 330 may be in contact with a portion where the second antenna module 320 overlaps the flexible printed circuit board 263. The conductive sheet 330 may be disposed in an overlapping portion between the second antenna module 320 and the flexible printed circuit board 263. The conductive sheet 330 may be omitted in the second area 1002 in which the second antenna module 320 and the flexible printed circuit board 263 do not overlap.

The second antenna module 320 may be disposed between a rear cover 1010 forming at least a portion of a rear surface of the electronic device 101 and a display 230 forming at least a portion of a front surface of the electronic device 101. The flexible printed circuit board 263 and the second antenna module 320 may overlap in a direction from the display 230 toward the rear cover 1010.

A buffer member 350 may be disposed between the rear cover 1010 and the second antenna module 320. The buffer member 350 may be disposed on a protective film (e.g., carrier film) 1020 of the second antenna module 320. The protective film 1020 may cover a conductive layer 1030. The conductive pattern 322 and/or the conductive layers 321*b* and 321*c* described above may be formed in the conductive layer 1030. A shielding sheet 1040 and a heat dissipation sheet 1050 may be disposed under the conductive layer 1030. For example, the shielding sheet 1040 may be provided for electromagnetic interference (EMI) shielding of the second antenna module 320. The heat dissipation sheet 1050 may be provided to dissipate heat generated from the second antenna module 320. The heat dissipation sheet 1050 may include graphite. The heat dissipation sheet 1050 may be formed of a plurality of layers. The heat dissipation sheet 1050 may be formed of two layers stacked on each other in the second area 1002. For example, the shielding sheet 1040 and the heat dissipation sheet 1050 may be in contact with a portion of the conductive sheet 330. For example, a dielectric film 1060 may be disposed under the heat dissipation sheet 1050. For example, the dielectric film 1060 may include polyethylene terephthalate (PET), but is not limited thereto. A protective film 1070 may be disposed under the dielectric film 1060. For example, the protective film 1070 may include poly urethane (PU), but is not limited thereto. The second antenna module 320 may at least partially overlap the flexible printed circuit board 1080 electrically connected to a connector connected to the battery 189 and/or an external electronic device (e.g., USB).

According to an embodiment of the disclosure, an electronic device 101 is provided. The electronic device 101 may comprise a housing 201, a printed circuit board 261, at least one processor 120, a first antenna module 310, a flexible printed circuit board 263, a second antenna module 320, and a conductive sheet 330. The housing 201 may include a support 215. The printed circuit board 261 may be disposed in the housing 201. The at least one processor 120 may be disposed on the printed circuit board 261. The first antenna module 310 may be spaced apart from the printed circuit board 261 in the housing 201. The flexible printed circuit board 263 may be disposed in the housing 201, and coupled to the printed circuit board 261 and the first antenna module 310, to electrically connect the printed circuit board 261 and the first antenna module 310. The second antenna module 320 may be disposed in the housing 201, and include a base substrate 321 and a conductive pattern 322 disposed on the base substrate 321. The flexible printed circuit board 263 may be at least partially overlapped with the second antenna module 320 in a direction of a rear surface of the housing 201, between the printed circuit board 261 and the first antenna module 310. The at least a portion of the conductive sheet 330 may be disposed between the second antenna module 320 and the flexible printed circuit board 263 at a portion where the second antenna module 320 and the flexible printed circuit board 263 overlap. According to an electronic device 101 of the disclosure, the electronic device 101 may include a foldable electronic device. The foldable electronic device may have a limited mounting space for a housing. The electronic device 101 may include the printed circuit board 261 and the first antenna module 310 spaced apart from each other due to a limitation of a mounting space. The electronic device 101 may include the flexible printed circuit board 263 for electrically connecting the printed circuit board 261 and the first antenna module 310. As the flexible printed circuit board 263 extends from the printed circuit board 261 to the first antenna module 310, the flexible printed circuit board 263 and the second antenna module 320 may at least partially overlap. In order to reduce electromagnetic interaction due to overlapping of the flexible printed circuit board 263 and the second antenna module 320, the electronic device 101 may include the conductive sheet 330. The conductive sheet 330 may be disposed between a portion of the second antenna module 320 and a portion of the flexible printed circuit board 263 overlapping each other, thereby reducing interference between the second antenna module 320 and the flexible printed circuit board 263. At least a portion of the conductive sheet 330 may be disposed between a portion of the second antenna module 320 and a portion of the flexible printed circuit board 263 overlapping in the direction. As the interference is reduced by the conductive sheet 330, the communication performance of the electronic device 101 may be improved.

For example, the electronic device 101 may further comprise a fixing structure 340 penetrating the base substrate 321 and the conductive sheet 330 and at least partially inserted into the support 215 to fix the second antenna module 320 to the support 215.

For example, the conductive sheet 330 may be grounded to the support 215 through the fixing structure 340. The electronic device 101 may ground the conductive sheet 330 through a fixing structure 340 for fixing the second antenna module 320. The grounded conductive sheet 330 may reduce electromagnetic interaction between the second antenna module 320 and the flexible printed circuit board 263 overlapping each other.

For example, the fixing structure 340 may be spaced apart from the flexible printed circuit board 263.

For example, the fixing structure 340 may further comprise a washer 341 including an opening part and attached to the base substrate 321, and a screw 342 penetrating the opening part, the base substrate 321, and the conductive sheet 330 and at least partially inserted into the support 215.

For example, the support 215 may include a recess portion 710 in which at least a portion of the first antenna module 310 is accommodated.

For example, the flexible printed circuit board 263 may be disposed on the support 215. The at least a portion of the flexible printed circuit board 263 overlapping the second antenna module 320 320 may be disposed between the support 215 and the second antenna module.

For example, the base substrate 321 may include a dielectric layer 321*a*, a first conductive layer 321*b* disposed on a surface 3211 of the dielectric layer 321*a*, and a second conductive layer 321*c* disposed on another surface 3212 of the dielectric layer 321*a* opposite to the surface 3211. The conductive sheet 330 may be in contact with the second conductive layer 321*c*.

For example, the first conductive layer 32*b* may be electrically connected to the second conductive layer 321*c* through conductive via 321*d* formed in the dielectric layer 321*a*. The first conductive layer 321*b* may be electrically isolated from the conductive pattern 322.

For example, the conductive sheet 330 may be included in the base substrate 321 by integrally formed with the base substrate 321.

For example, the housing 201 may include a first housing 210 and a second housing 220 foldable with respect to at least one folding axis f. The printed circuit board 261, the first antenna module 310, the second antenna module 320, the flexible printed circuit board 263, and the conductive sheet 330 may be disposed in the first housing 210.

For example, the first housing 210 may include a first edge 210*a* parallel to the at least one folding axis f and a second edge 210*b* opposite to the first edge 210*a*. The first edge 210*a* may be located closer to the second housing 220 than the second edge 210*b*. The first antenna module 310 may be located closer to the first edge 210*a* of the first edge 210*a* and the second edge 210*b*.

For example, the electronic device 101 may further comprise a battery 189 disposed between the first edge 210*a* and the second edge 210*b* in the first housing 210. The first antenna module 310 may be disposed between the battery 189 and the first edge 210*a*.

For example, the electronic device 101 may further comprise a hinge structure 250 and a display 230. The hinge structure 250 may include a first hinge plate 252 operatively coupled to the first housing 210 and a second hinge plate 253 operatively coupled to the second housing 220 and rotatable relative to the first hinge plate 252 with respect to the folding axis f. The display 230 may include a first display area 231 disposed on the first housing 210, a second display area 232 disposed on the second housing 220, and a third display area 233 disposed between the first display area 231 and the second display area 232 and deformable based on the second housing 220 rotated with respect to the first housing 210. The hinge structure 250 may be configured to change the electronic device 101 from a folded state in which the first display area 231 and the second display area 232 are substantially facing each other to an unfolded state in which the first display area 231 and the second display area 232 are facing the same direction. A rotation angle of the first hinge plate 252 and a rotation angle of the second hinge plate 253 may be different from a rotation angle of the first housing 210 and a rotation angle of the second housing 220, when the electronic device 101 changes from the unfolded state to the folded state.

For example, the hinge structure 250 may further include a hinge bracket 255 including a first guide groove 255*a* to which the first hinge plate 252 is slidably coupled and a second guide groove 255*b* to which the second hinge plate 253 is slidably coupled. The electronic device 101 of the disclosure may provide a structure in which a curvature change of the flexible display 230 is gentle in a folding state. For example, when the first hinge plate 252 and the second hinge plate 253 are stacked in the folding state, a curvature of the flexible display 230 supported by the first hinge plate 252 and the second hinge plate 253 may be changed rapidly between the first hinge plate 252 and the second hinge plate 253. According to an embodiment, since the first hinge plate 252 and the second hinge plate 253 are inclined with respect to each other in the folding state, a curvature change of the flexible display 230 may become gentle. Since the curvature of the flexible display 230 is changed gently, damage to the flexible display 230 may be reduced.

For example, the first antenna module 310 may be spaced apart from the printed circuit board 261 along an extending direction of the at least one folding axis f.

For example, the hinge structure 250 may include a first hinge device 254*a*, a second hinge device 254*b* spaced apart from the first hinge device 254*a* along the extending direction of the at least one folding axis f, and a third hinge device 254*c* spaced apart from the second hinge device 254*b* along the extending direction of the at least one folding axis f. The first antenna module 310 may be disposed between the second hinge device 254*b* and the third hinge device 254*c*.

For example, the electronic device 101 may further comprise another printed circuit board 262 disposed in the second housing 220, and another flexible printed circuit board 265 electrically connecting the printed circuit board and the other printed circuit board 262. The at least a portion of the other flexible printed circuit board may be disposed between the first hinge device 254*a* and the second hinge device 254*b*. For example, the other flexible printed circuit board 265 may extend from the second housing 220 to the first housing 210 across the hinge structure 250. The other flexible printed circuit board 265 may pass through the hinge structure 250 between the first hinge device 254*a* and the second hinge device 254*b*.

According to an embodiment of the disclosure, an electronic device 101 is provided. The electronic device 101 may comprise a printed circuit board, a first antenna module 310, a flexible printed circuit board 263, a second antenna module 320, and a conductive sheet 330. The first antenna module 310 may be spaced apart from the printed circuit board in a first direction. The flexible printed circuit board 263 may be coupled to the printed circuit board and the first antenna module 310 to electrically connect the printed circuit board and the first antenna module 310. The second antenna module 320 may include a base substrate 321 and a conductive pattern 322 disposed on the base substrate 321. The flexible printed circuit board 263 may at least partially overlaps the second antenna module 320 in a second direction perpendicular to the first direction, between the printed circuit board and the first antenna module 310. The portion of the conductive sheet 330 may be disposed between the second antenna module 320 and the flexible printed circuit board 263 at a portion where the second antenna module 320 and the flexible printed circuit board 263 overlap.

For example, the electronic device 101 may further comprise a fixing structure 340 penetrating the base substrate 321 and the conductive sheet 330 and at least partially inserted into the support 215 to fix the second antenna module 320 to the support 215. The conductive sheet 330 may be grounded to the support 215 through the fixing structure 340.

The electronic device according to various embodiments of the disclosure may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory 130 of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including a support;

a printed circuit board disposed in the housing;

at least one processor disposed on the printed circuit board;

a first antenna module spaced apart from the printed circuit board in the housing;

a flexible printed circuit board disposed in the housing, and coupled to the printed circuit board and the first antenna module, to electrically connect the printed circuit board and the first antenna module;

a second antenna module disposed in the housing, and including a base substrate and a conductive winded coil pattern disposed on the base substrate, wherein the second antenna module is used for at least one of near field communication or wireless charging; and a conductive sheet, wherein the flexible printed circuit board at least partially overlaps the second antenna module in a direction of a rear surface of the housing, between the printed circuit board and the first antenna module, and wherein at least a portion of the conductive sheet is disposed between the second antenna module and the flexible printed circuit board at a region where the second antenna module and the flexible printed circuit board overlap.

2. The electronic device of claim 1, further comprising:

a fixing structure penetrating the base substrate and the conductive sheet and at least partially inserted into the support to fix the second antenna module to the support.

3. The electronic device of claim 2, wherein the conductive sheet is grounded to the support through the fixing structure.

4. The electronic device of claim 2, wherein the fixing structure is spaced apart from the flexible printed circuit board.

5. The electronic device of any one of claim 2, wherein the fixing structure further comprises:

a washer including an opening part and attached to the base substrate, and a screw penetrating the opening part, the base substrate, and the conductive sheet and at least partially inserted into the support.

6. The electronic device of claim 1, wherein the support includes a recess portion in which at least a portion of the first antenna module is accommodated.

7. The electronic device of claim 1, wherein the flexible printed circuit board is disposed on the support, and wherein the at least a portion of the flexible printed circuit board overlapping the second antenna module is disposed between the support and the second antenna module.

8. The electronic device of claim 1, wherein the base substrate includes:

a dielectric layer, a first conductive layer disposed on a surface of the dielectric layer, and a second conductive layer disposed on another surface of the dielectric layer opposite to the surface, and wherein the conductive sheet is in contact with the second conductive layer.

9. The electronic device of claim 8, wherein the first conductive layer is electrically connected to the second conductive layer through conductive via formed in the dielectric layer, and wherein the first conductive layer is electrically isolated from the conductive pattern.

10. The electronic device of claim 1, wherein the conductive sheet is included in the base substrate by integrally formed with the base substrate.

11. The electronic device of claim 1, wherein the housing includes a first housing and a second housing foldable with respect to at least one folding axis, and wherein the printed circuit board, the first antenna module, the second antenna module, the flexible printed circuit board, and the conductive sheet are disposed in the first housing.

12. The electronic device of claim 11, wherein the first housing includes a first edge parallel to the at least one folding axis and a second edge opposite to the first edge, wherein the first edge is located closer to the second housing than the second edge, and wherein the first antenna module is located closer to the first edge of the first edge and the second edge.

13. The electronic device of claim 12, further comprising:

a battery disposed between the first edge and the second edge in the first housing, wherein the first antenna module is disposed between the battery and the first edge.

14. The electronic device of claim 11, further comprising:

a hinge structure including a first hinge plate operatively coupled to and a second hinge plate operatively coupled to the second housing and rotatable relative to the first hinge plate with respect to the folding axis; and a display including a first display area disposed on the first housing, a second display area disposed on the second housing, and a third display area disposed between the first display area and the second display area and deformable based on the second housing rotated with respect to the first housing, wherein the hinge structure is configured to change the electronic device from a folded state in which the first display area and the second display area are substantially facing each other to an unfolded state in which the first display area and the second display area are facing the same direction, and wherein a rotation angle of the first hinge plate and a rotation angle of the second hinge plate are different from a rotation angle of the first housing and a rotation angle of the second housing, when the electronic device changes from the unfolded state to the folded state.

15. The electronic device of claim 14, wherein the hinge structure further includes a hinge bracket including a first guide groove to which the first hinge plate is slidably coupled and a second guide groove to which the second hinge plate is slidably coupled.

16. The electronic device of claim 14, wherein the first antenna module is spaced apart from the printed circuit board along an extending direction of the at least one folding axis.

17. The electronic device of claim 16, wherein the hinge structure includes a first hinge device, a second hinge device spaced apart from the first hinge device along the extending direction of the at least one folding axis, and a third hinge device spaced apart from the second hinge device along the extending direction of the at least one folding axis, and wherein the first antenna module is disposed between the second hinge device and the third hinge device.

18. The electronic device of claim 17, further comprising:

another printed circuit board disposed in the second housing, and another flexible printed circuit board electrically connecting the printed circuit board and the other printed circuit board, and wherein at least a portion of the other flexible printed circuit board is disposed between the first hinge device and the second hinge device.

19. An electronic device comprising:

a housing;

a printed circuit board disposed in the housing;

a first antenna module, disposed in the housing, spaced apart from the printed circuit board in a first direction;

a flexible printed circuit board, disposed in the housing, coupled to the printed circuit board and the first antenna module to electrically connect the printed circuit board and the first antenna module;

a second antenna module, disposed in the housing, including a base substrate and a conductive winded coil pattern disposed on the base substrate, wherein the second antenna module is used for at least one of near field communication or wireless charging; and a conductive sheet disposed in the housing, wherein the flexible printed circuit board at least partially overlaps the second antenna module in a second direction perpendicular to the first direction, between the printed circuit board and the first antenna module, and wherein at least a portion of the conductive sheet is disposed between the second antenna module and the flexible printed circuit board at a portion region where the second antenna module and the flexible printed circuit board overlap.

20. The electronic device of claim 19, further comprising:

a support; and a fixing structure penetrating the base substrate and the conductive sheet and at least partially inserted into the support to fix the second antenna module to the support, and wherein the conductive sheet is grounded to the support through the fixing structure.

* * * * *